(12) United States Patent
Gupta et al.

(10) Patent No.: US 11,392,976 B2
(45) Date of Patent: Jul. 19, 2022

(54) METHOD AND SYSTEM FOR FACILITATING REUSE OR RECYCLING OF PACKING BAGS

(71) Applicant: MASTERCARD INTERNATIONAL INCORPORATED, Purchase, NY (US)

(72) Inventors: Naveen Kumar Gupta, Pune (IN); Ajay Sinha, Pune (IN); Bhargav Jagdishchandra Modi, Gujarat (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/856,389

(22) Filed: Apr. 23, 2020

(65) Prior Publication Data
US 2020/0410524 A1     Dec. 31, 2020

(30) Foreign Application Priority Data
Jun. 28, 2019    (SG) .............................. 10201906068S

(51) Int. Cl.
*G06Q 30/00*     (2012.01)
*G06Q 30/02*     (2012.01)
*G06Q 10/00*     (2012.01)

(52) U.S. Cl.
CPC ......... *G06Q 30/0233* (2013.01); *G06Q 10/30* (2013.01); *G06Q 30/0222* (2013.01); *G06Q 30/0232* (2013.01)

(58) Field of Classification Search
CPC ....................................................... G06Q 10/30
See application file for complete search history.

(56) References Cited

U.S. PATENT DOCUMENTS

| | | | | |
|---|---|---|---|---|
| 2007/0100694 | A1* | 5/2007 | Kopps ................... | G06Q 30/02 705/14.31 |
| 2009/0138358 | A1* | 5/2009 | Gonen ................... | G06Q 30/00 705/14.54 |
| 2012/0029985 | A1* | 2/2012 | Wilson ................... | G06Q 10/30 705/14.11 |
| 2015/0088620 | A1* | 3/2015 | Wittek .............. | G06Q 30/0207 705/14.1 |

* cited by examiner

*Primary Examiner* — Alvin L Brown

(57) ABSTRACT

A method and a system for facilitating reuse or recycling of a packing bag are provided. A server links one or more details of the packing bag with a user identifier of a user based on an issuance of the packing bag to the user. The packing bag is associated with an identity tag that stores the one or more details of the packing bag. The server detects an occurrence of a first event associated with the packing bag. The first event corresponds to the reuse of the packing bag by the user or submission of the packing bag by the user for recycling. Based on the detection of the first event, the server credits one or more reward points to a reward point account that is associated with the user identifier of the user. The reward points credited to the reward point account are redeemable by the user.

20 Claims, 15 Drawing Sheets

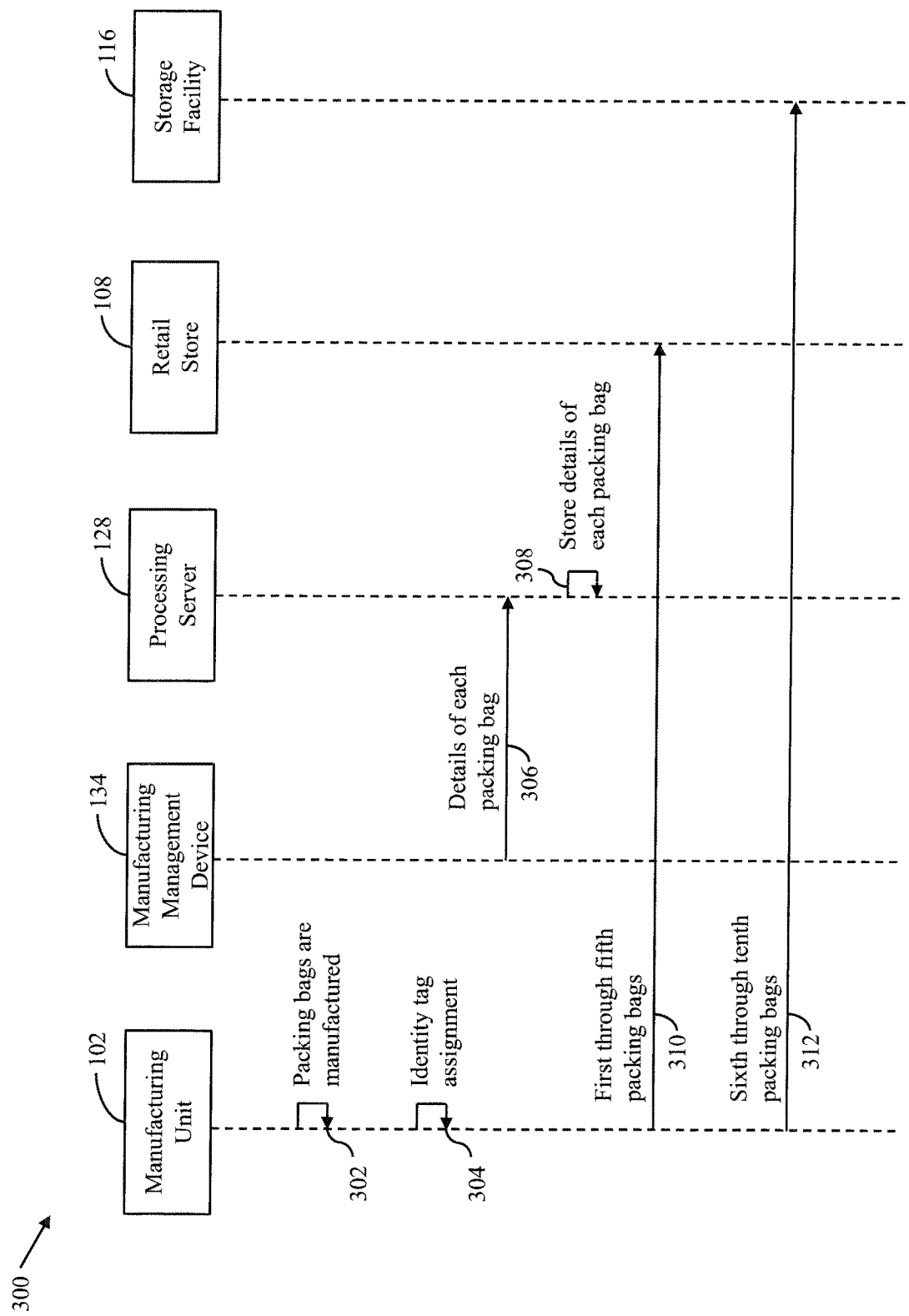

METHOD AND SYSTEM FOR FACILITATING REUSE OR RECYCLING OF PACKING BAGS

CROSS-REFERENCE TO RELATED APPLICATIONS

This application claims priority to Singapore Patent Application No. 10201906068S, filed Jun. 28, 2019, entitled "Method and System for Facilitating Reuse or Recycling of Packing Bags", the entirety of which is incorporated herein by reference.

FIELD

Various embodiments of the disclosure relate generally to reward point systems. More specifically, various embodiments of the disclosure relate to a method and a system for facilitating reuse or recycling of packing bags.

BACKGROUND

In today's world, packing bags have become an essential commodity in day-to-day activities of users. For example, the packing bags are used for carrying and packing various products such as food items, shopping items, electronic gadgets, or the like. The packing bags are predominantly made up of plastic. Typically, such packing bags are used once and then disposed of. Since plastic is non-biodegradable, the disposed packing bags that are made up of plastic remain in the environment for over 100 years. Thus, the damage caused to the environment by the plastic packing bags is long-lasting, which makes plastic one of the most prevalent factors in the deterioration of the environment. Halting the use of plastic in day-to-day life is very difficult due to the vastness of its utilization.

A known solution to reduce the deterioration of the environment includes reusing or recycling the existing plastic packing bags. This would reduce the need to manufacture new packing bags, and also prevent irregular and wrongful disposal of the packing bags. In order to ensure that the aforementioned solution is effective, users possessing the packing bags are encouraged to reuse or recycle the packing bags. Currently, preservation of the environment for the future is a singular motivation for the users to reuse or recycle the packing bags. However, the motivation for preserving the environment has not had a desired effect on the populace, and the erratic use of plastic has only soared with time, resulting in the continued deterioration of the environment.

In light of the foregoing, there exists a need for a solution that solves the abovementioned problems and provides a mechanism that facilitates reuse or recycle of packing bags, thereby aiding in the preservation of the environment.

SUMMARY

In accordance with a first aspect of the present invention, there is provided a method for facilitating reuse or recycling of a packing bag is provided. The method comprising linking, by a server, one or more details of the packing bag with a user identifier of a user based on an issuance of the packing bag to the user, wherein the packing bag is associated with an identity tag that stores the one or more details of the packing bag; detecting, by the server, an occurrence of a first event associated with the packing bag, wherein the first event corresponds to the reuse of the packing bag by the user or submission of the packing bag by the user for recycling; and crediting, by the server based on the detection of the first event, one or more reward points to a reward point account of the user.

In another embodiment of the disclosure, a system for facilitating reuse or recycling of a packing bag is provided. The system may include at least one memory; and at least one processor, coupled to the memory, that: links one or more details of the packing bag with a user identifier of a user based on an issuance of the packing bag to the user, wherein the packing bag is associated with an identity tag that stores the one or more details of the packing bag, detects an occurrence of a first event associated with the packing bag, wherein the first event corresponds to the reuse of the packing bag by the user or submission of the packing bag by the user for recycling, and credits, based on the detection of the first event, one or more reward points to a reward point account of the user.

In another embodiment of the disclosure, a packing bag is provided. The packing bag comprises an identity tag that stores one or more details of the packing bag, wherein the one or more details of the packing bag are linked to a user identifier of a user based on an issuance of the packing bag to the user, and wherein one or more reward points are credited to a reward point account of the user when the packing bag is reused by the user or submitted for recycling by the user.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the disclosure are illustrated by way of example, and not limited by the appended figures, in which like references indicate similar elements:

FIG. 3 is a process flow diagram that illustrates an exemplary scenario for distributing the packing bags, in accordance with an exemplary embodiment of the disclosure;

Figure 1:
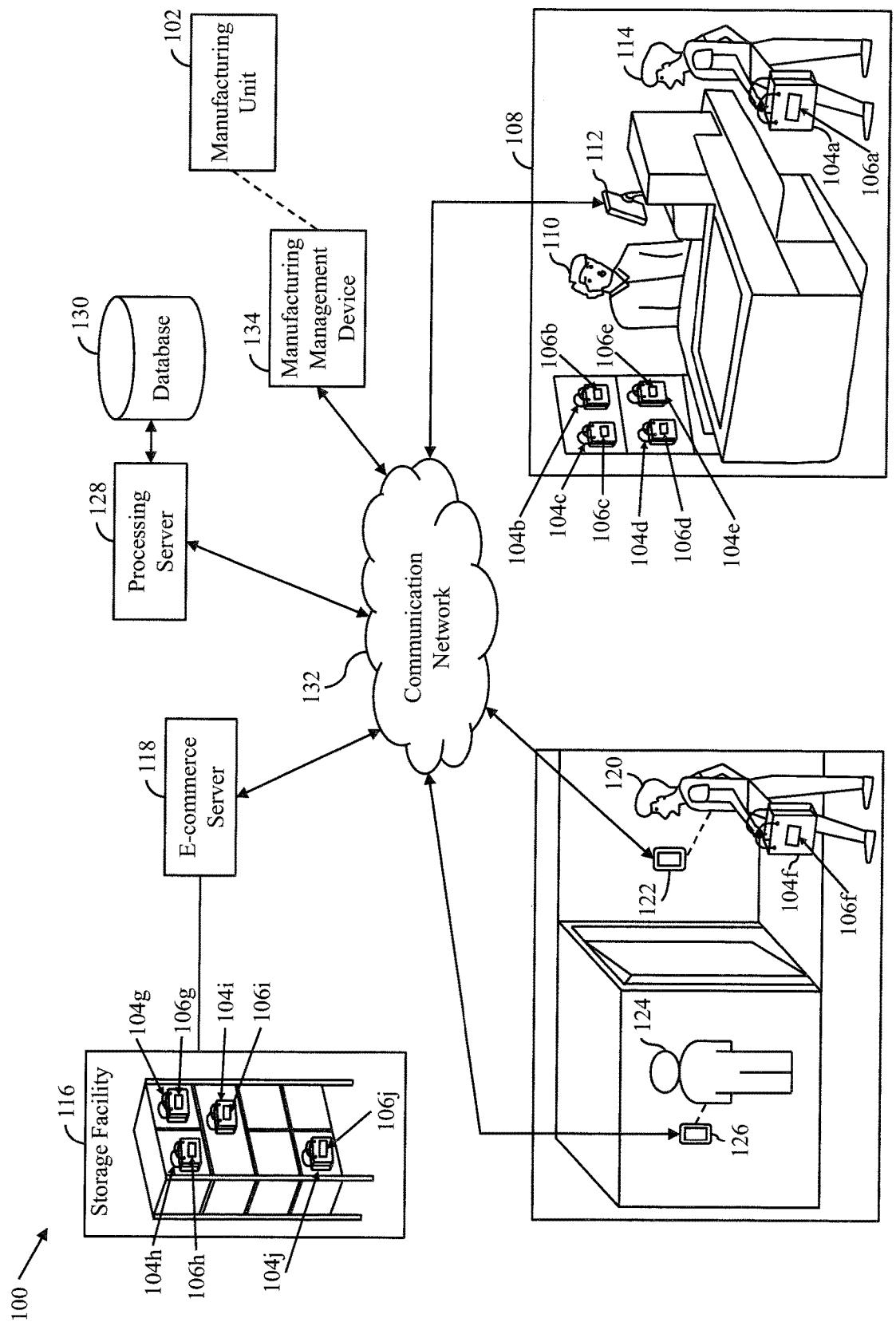
FIG. 1 is a block diagram that illustrates an exemplary environment for facilitating reuse or recycling of packing bags, in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Packing bags play a vital role in day-to-day activities of users. For example, the packing bags are used for carrying and packing products such as food items, shopping items, electronic gadgets, or the like. Decomposition of the packing bags, especially the packing bags made up of plastic, is one of the biggest environmental concern these days. In spite of various measures, the erratic use of packing bags has only soared with time.

Various embodiments of the disclosure provide a method and a system to solve the abovementioned problems by facilitating reuse or recycling of the packing bags. Each packing bag is associated with an identity tag that stores details of the corresponding packing bag. The details of each packing bag may include manufacturer's name and address, a manufacturing date, a packing bag identifier, minimum and maximum reuse counts, or the like. A user may be issued a packing bag based on a retail purchase from a retail store or an e-commerce purchase from an e-commerce application. When the packing bag is issued to the user, the details of the packing bag are linked to a user identifier of the user. When the issued packing bag is reused by the user or submitted for recycling, reward points are credited to a reward point account that is associated with the user identifier of the user. The earned reward points may be redeemed at a retail store, an e-commerce application, or any other platform that facilitates reward point redemption, for availing a discount or an equivalent cashback against a purchase.

As the user is incentivized to reuse the packing bag or submit the packing bag for recycling, the user is additionally motivated to reuse or recycle the packing bag. In addition to earning monetary benefits, the user also aids in the efforts of preserving the environment for the future.

Terms Description (in Addition to Plain and Dictionary Meaning)

Packing bag is a reusable and recyclable flexible case with an opening at one or more ends, and is used for carrying or packing various products. The products carried or packed in the packing bag may include shopping items, food items, showpieces, electronic gadgets, or the like. The packing bag has a unique identity tag associated therewith. The packing bag may be available at a retail store or a storage facility, and may be issued to a user based on a retail purchase or an e-commerce purchase.

Identity tag is a unique identifier attached to (or printed on) a packing bag for uniquely identifying the packing bag. The identity tag may be attached to (or printed on) an outer surface of the packing bag or an inner surface of the packing bag. The identity tag stores details of the packing bag. The details of the packing bag may include a manufacturer's name, a manufacturer's address, a manufacturing date, a packing bag identifier, minimum and maximum reuse counts, and/or the like.

Reward points are rewards earned by a user for reusing an issued packing bag or submitting the issued packing bag for recycling. The packing bag may be issued to the user for purchases made at retail stores, e-commerce applications, or the like. In one example, the reward points earned by the user increase with each reuse of the packing bag. Additionally, a count of reward points that are credited, when a reuse count of the packing bag exceeds a maximum reuse count of the packing bag, is more than a count of reward points that are credited when the reuse count is less than the maximum reuse count. The earned reward points may be redeemed by the user against a purchase made at retail stores, e-commerce applications, or any other platform that facilitates reward point redemption. The reward points may be redeemed for availing a discount, an equivalent cashback, or the like.

Reward point account is an account of a user for maintaining reward points earned by the user. The reward points are credited to the reward point account when the user reuses an issued packing bag or submits the issued packing bag for recycling. The reward points may be debited from the reward point account when the user redeems the reward points against a purchase made at retail stores, e-commerce applications, or any other platform that facilitates reward point redemption.

E-commerce purchase corresponds to an online purchase of a product from an e-commerce application. The e-commerce application may be a mobile application or a web application hosted by an e-commerce server. The product purchased by a user is delivered to the user by a delivery executive. A packing bag issued to the user for the e-commerce purchase corresponds to the packing bag in which the product purchased by the user is packed.

Retail purchase corresponds to a purchase of a product from a retail store (i.e., a brick and mortar store). A user makes the retail purchase by visiting the retail store. A packing bag is issued to the user by a retail operative working at the retail store, for carrying the purchased product.

Reuse count of a packing bag represents a number of times the packing bag is reused. The reuse count is a value of a reuse counter of the packing bag. The reuse counter may be maintained in a database and is incremented after each reuse of the packing bag. Thus, the reuse count increases after each reuse of the packing bag.

Minimum reuse count of a packing bag is a minimum number of times the packing bag has to be reused for earning reward points. In one example, a user reusing the packing bag is awarded reward points only when a reuse count of the packing bag is greater than or equal to the minimum reuse count.

Maximum reuse count of a packing bag is a maximum number of times the packing bag may be reused. However, the packing bag remains reusable after the maximum reuse count is reached. In one example, a user reusing the packing bag is awarded additional reward points if a reuse count of the packing bag is greater than the maximum reuse count.

FIG. 1 is a block diagram that illustrates an exemplary environment 100 for facilitating reuse or recycling of packing bags, in accordance with an exemplary embodiment of the disclosure. The environment 100 includes a manufacturing unit 102 that manufactures a plurality of packing bags 104 (for example, first through tenth packing bags 104a-104j). The first through tenth packing bags 104a-104j are associated with first through tenth identity tags 106a-106j (collectively referred to as "identity tags 106"), respectively. The environment 100 further includes a retail store 108, a retail operative 110, a retail device 112, a first user 114, a storage facility 116, an e-commerce server 118, a delivery executive 120, an executive device 122, a second user 124, and a user device 126 associated with the second user 124. The environment 100 further includes a processing server 128 and a database 130. The retail device 112, the e-commerce server 118, the executive device 122, the user device 126, and the processing server 128 communicate with each other by way of a communication network 132 or through separate communication networks established therebetween.

Figure 2B:
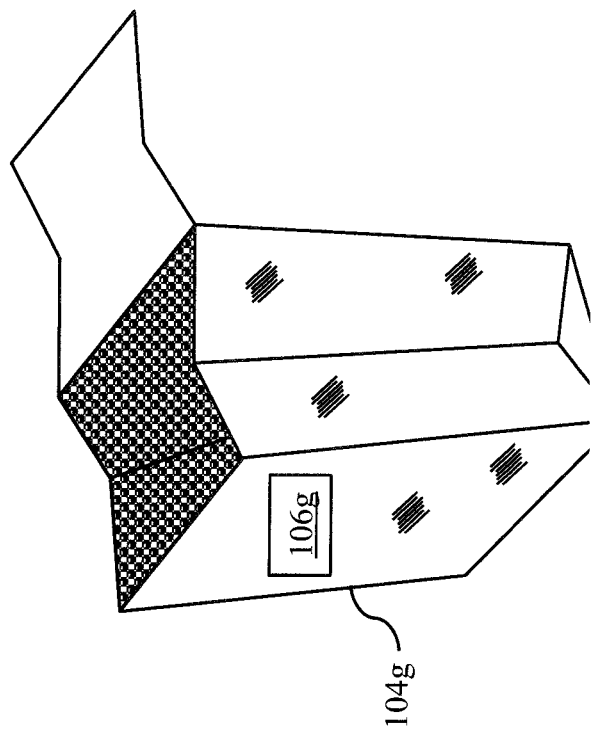
FIG. 2B is a block diagram that illustrates a second exemplary packing bag, in accordance with another exemplary embodiment of the disclosure.
Figure 2A:
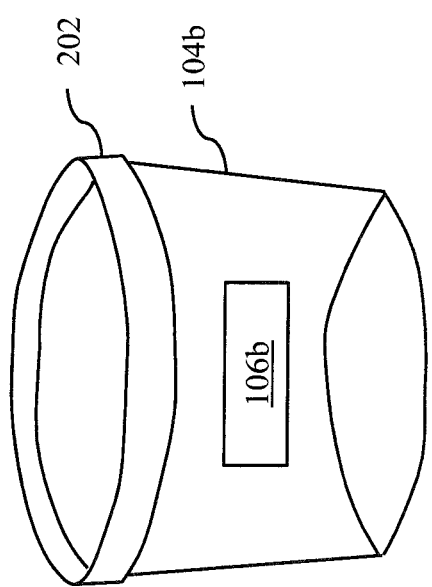
FIG. 2A is a block diagram that illustrates a first exemplary packing bag, in accordance with an exemplary embodiment of the disclosure.

The manufacturing unit 102 manufactures the packing bags 104. Each packing bag 104 is a reusable and recyclable bag that may be utilized for various purposes such as, carrying and packing various products. Examples of the products may include, but are not limited to, clothing items, food items, groceries, showpieces, electronic gadgets, or the like. The packing bags 104 may have different shapes and sizes, and may be utilized for different purposes. Examples of various shapes and sizes of the packing bags 104 are illustrated in FIGS. 1, 2A, and 2B.

Each packing bag 104 is associated with a unique identity tag that stores details of the corresponding packing bag 104. For example, the first through tenth packing bags 104a-104j are respectively associated with the first through tenth identity tags 106a-106j that store the details of the corresponding packing bag 104. The details of each packing bag 104 may include, but are not limited to, a manufacturer's name, a manufacturer's address, a manufacturing date, a packing bag identifier, a minimum reuse count, and/or a maximum reuse count. The minimum reuse count is a minimum number of times each packing bag 104 has to be reused for earning reward points. The maximum reuse count is a maximum number of times each packing bag 104 may be reused. However, each packing bag 104 remains reusable after the maximum reuse count is reached.

In one example (as shown in FIG. 1), the first through tenth identity tags 106a-106j may be attached to (or printed on) outer surfaces of the first through tenth packing bags 104a-104j, respectively. In another example, the first through tenth identity tags 106a-106j may be attached to (or printed on) inner surfaces of the first through tenth packing bags 104a-104j, respectively. In one embodiment, each identity tag 106 is a near field communication (NFC) enabled tag. In another embodiment, each identity tag 106 is a quick response (QR) code. Other examples of the identity tags 106 may include, but are not limited to, radio-frequency identification (RFID) tags or barcodes. The packing bags 104 are distributed to various retail stores, storage facilities, or the like, for the purpose of sale. For example, the first through fifth packing bags 104a-104e are distributed to the retail store 108 and the sixth through tenth packing bags 104f-104j are distributed to the storage facility 116.

For the sake of brevity, it is assumed that the first through tenth identity tags 106a-106j are attached to the packing bags 104, respectively, when the packing bags 104 are manufactured at the manufacturing unit 102. However, it will be apparent to a person skilled in the art that the scope of the disclosure is not limited to it. In various other embodiments, the first through tenth identity tags 106a-106j may be detachable tags that are attached to the packing bags 104, respectively, after the packing bags 104 are distributed to various retail stores, storage facilities, or the like, without departing from the scope of the disclosure. For example, the first through fifth identity tags 106a-106e may be attached to the first through fifth packing bags 104a-104e, respectively, at the retail store 108. Similarly, the sixth through tenth identity tags 106f-106j may be attached to the sixth through tenth packing bags 104f-104j, respectively, at the storage facility 116.

The manufacturing unit 102 may be associated with a manufacturing management device 134 that manages and maintains a record of the manufacture and distribution of the packing bags 104. For example, the manufacturing management device 134 maintains a log of packing bags (for example, the packing bags 104) that are manufactured at the manufacturing unit 102 and distributed to various retail stores and storage facilities, in a memory (not shown)

associated with the manufacturing management device 134. The manufacturing management device 134 may transmit the details of the packing bags 104 to the processing server 128 by way of the communication network 132.

The retail store 108 is a brick and mortar store that sells various products to users (e.g., the first user 114). The retail store 108 further sells packing bags for carrying the purchased products. For example, the retail store 108 stores the first through fifth packing bags 104a-104e received from the manufacturing unit 102, for sale to the users. Thus, the retail store 108 facilitates issue of the packing bags (e.g., the first through fifth packing bags 104a-104e) to the users for carrying the purchased products. The retail store 108 may further facilitate reuse of the issued packing bags and submission of the issued packing bags for recycling. The retail store 108 may further facilitate redemption of reward points that are earned by the users on reusing the issued packing bags or submitting the issued packing bags for recycling.

Though the manufacturing unit 102 and the retail store 108 are shown as separate entities in FIG. 1, the scope of the disclosure is not limited to it. In another embodiment, the manufacturing unit 102 and the retail store 108 correspond to a single entity. In such a scenario, the operations performed at the manufacturing unit 102 (as described above) may be performed at the retail store 108.

The retail operative 110 is an individual who is associated with the retail store 108. For example, the retail operative 110 may be a sales person at the retail store 108 or an owner of the retail store 108. The retail operative 110 issues the packing bags (e.g., the first through fifth packing bags 104a-104e) to the users based on a purchase from the retail store 108 (hereinafter, the purchase from the retail store 108 is referred to as "retail purchase").

The retail device 112 includes suitable logic, circuitry, interfaces, and/or code, executable by the circuitry, for executing one or more operations to obtain the details of the packing bags (e.g., the first through fifth packing bags 104a-104e) that are issued, reused, or submitted for recycling at the retail store 108. For example, when a packing bag (e.g., the first packing bag 104a) is issued, reused, or submitted for recycling, an identity tag of the packing bag may be scanned or read by the retail device 112 for obtaining the details of the packing bag. In one exemplary scenario, the retail device 112 may be an NFC enabled device that is configured to read the details stored in the identity tag of the packing bag, in a contactless manner. In another exemplary scenario, the retail device 112 may include a scanner to scan the identity tag for reading the details stored in the identity tag. Examples of the retail device 112 may include a laptop, a tablet, a phablet, a computer, a point-of-purchase (POP) device, a point-of-interaction (POI) device, a point-of-sale (POS) device, or the like. The retail device 112 transmits the details of the packing bag to the processing server 128.

In an exemplary scenario, the first user 114 may visit the retail store 108 for purchasing a first product sold at the retail store 108. The first user 114 may further request the retail operative 110 to issue a packing bag to the first user 114 for carrying the first product. Based on the request of the first user 114, the first packing bag 104a is issued to the first user 114 by the retail operative 110. The first user 114 may provide a first user identifier of the first user 114 to the retail operative 110 for making the retail purchase of the first product. Examples of the first user identifier may include, but are not limited to, a contact number, an electronic mail identifier (e-mail id), or any other unique identifier of the first user 114. Upon issuance of the first packing bag 104a, the retail device 112 is used by the retail operative 110 for reading or scanning the first identity tag 106a of the first packing bag 104a. By reading the first identity tag 106a, the retail device 112 receives the details of the first packing bag 104a stored in the first identity tag 106a. The retail operative 110 may further provide the first user identifier, provided by the first user 114, to the retail device 112. The retail device 112 then transmits the received details of the first packing bag 104a and the first user identifier to the processing server 128.

The first user 114, upon issuance of the first packing bag 104a, may reuse the first packing bag 104a, or submit (or return) the first packing bag 104a for recycling. For example, the first user 114 may reuse the first packing bag 104a at the same retail store 108. In another example, the first user 114 may reuse the first packing bag 104a at a different retail store. In another example, the first user 114 may submit the first packing bag 104a for recycling at the same retail store 108, at a different retail store, or at a recycling station (not shown).

When the first user 114 reuses the first packing bag 104a (or submits the first packing bag 104a for recycling) at the retail store 108, the retail device 112 may be used by the retail operative 110 to read or scan the first identity tag 106a of the first packing bag 104a. The retail device 112 then transmits the details of the first packing bag 104a to the processing server 128. Additionally, the retail device 112 transmits the first user identifier to the processing server 128. Based on the reuse or submission of the first packing bag 104a, reward points are credited to a first reward point account of the first user 114.

The first user 114 may want to redeem the added reward points for subsequent purchases at retail stores (such as the retail store 108), e-commerce applications, or the like. For example, when the first user 114 redeems the reward points against a subsequent purchase made at the retail store 108, the retail device 112 communicates a first redemption request to the processing server 128. The first redemption request may include the first user identifier or a first account identifier of the first reward point account. In one example, the first account identifier is an account number of the first reward point account. Based on the redemption of the reward points, the first user 114 may get a discount against the purchase, a cashback equivalent to the redeemed reward points, an equivalent cash amount, or one or more other reward point benefits that are known to a person of ordinary skill in the art.

The storage facility 116 stores various products that are listed for sale on an e-commerce application. The e-commerce application may correspond to an e-commerce mobile application or an e-commerce web application hosted by the e-commerce server 118. The storage facility 116 further stores packing bags for packing the sold products. For example, the storage facility 116 stores the sixth through tenth packing bags 104f-104j received from the manufacturing unit 102, for packing the sold products.

Though the manufacturing unit 102 and the storage facility 116 are shown as separate entities in FIG. 1, the scope of the disclosure is not limited to it. In another embodiment, the manufacturing unit 102 and the storage facility 116 correspond to a single entity. In such a scenario, the operations performed at the manufacturing unit 102 (as described above) may be performed at the storage facility 116.

The e-commerce server 118 includes suitable logic, circuitry, interfaces, and/or code, executed by the circuitry, for hosting the e-commerce application. The e-commerce application hosted by the e-commerce server 118 is executable on user devices of the users, thereby facilitating online purchase of the products. The e-commerce server 118 stores details of the products sold by the e-commerce application in a memory (not shown) associated with the e-commerce server 118. The e-commerce server 118 further stores the details of the packing bags (e.g., the sixth through tenth packing bags 104*f*-104*j*) stored in the storage facility 116, in the memory associated with the e-commerce server 118.

The e-commerce server 118 further facilitates the submission (or return) of the issued packing bags for recycling. The issued packing bags may correspond to the packing bags that are issued to various users by the e-commerce server 118 for packing the products purchased by those users. Additionally, the issued packing bags may correspond to the packing bags issued to various users at the retail store 108. The e-commerce server 118 further facilitates the redemption of reward points that are earned by the users, on reusing the packing bags or submitting the packing bags for recycling. Examples of the e-commerce server 118 include, but are not limited to, personal computers, laptops, mini-computers, mainframe computers, any non-transient and tangible machine that can execute a machine-readable code, cloud-based servers, distributed server networks, or a network of computer systems. The e-commerce server 118 may be realized through various web-based technologies such as, but not limited to, a Java web-framework, a .NET framework, a personal home page (PHP) framework, or any other web-application framework.

The delivery executive 120 is an individual who delivers online purchased products to the respective users. In one embodiment, a user may return a packing bag used for packing a product to the delivery executive 120 at the time of delivery of the same product to the user. In another embodiment, the user may return another packing bag used for packing a previously delivered product to the delivery executive 120 at the time of delivery of the current product. In such scenarios, the delivery executive 120 may collect the returned packing bag from the respective user, and utilize the executive device 122 for obtaining the details of the returned packing bag. The delivery executive 120 further delivers the collected packing bag to the storage facility 116.

The executive device 122 includes suitable logic, circuitry, interfaces, and/or code, executed by the circuitry, for executing one or more operations to obtain the details of packing bags returned (or submitted) by the users to the delivery executive 120. For example, when a packing bag (e.g., the sixth packing bag 104*f*) is returned (or submitted) to the delivery executive 120, an identity tag of the packing bag may be scanned or read by the executive device 122 for obtaining the details of the returned packing bag. In one exemplary scenario, the executive device 122 may be an NFC enabled device that is configured to read the details stored in the identity tag of the returned packing bag, in a contactless manner. In another exemplary scenario, the executive device 122 may include a scanner to scan the identity tag for reading the details stored in the identity tag. Examples of the executive device 122 may include a mobile phone, a smartphone, a tablet, a phablet, or the like. In one embodiment, the executive device 122 may directly transmit the details of the returned packing bag to the processing server 128. In another embodiment, the executive device 122 may transmit the details of the returned packing bag to the processing server 128 by way of the e-commerce server 118.

In an exemplary scenario, the second user 124 may utilize the user device 126 to access the e-commerce application hosted by the e-commerce server 118 for purchasing a second product online (i.e., an e-commerce purchase). Examples of the user device 126 may include, but are not limited to, a mobile phone, a smartphone, a laptop, a tablet, a phablet, or any other communication device. While initiating the e-commerce purchase, the second user 124 may provide a second user identifier of the second user 124 to the e-commerce server 118 by way of the user device 126. Examples of the second user identifier may include a contact number, an email id, or any other unique identifier of the second user 124. The e-commerce server 118 issues the sixth packing bag 104*f* to the second user 124 for packing the second product purchased by the second user 124. The e-commerce server 118 then transmits the details of the issued sixth packing bag 104*f* and the second user identifier to the processing server 128. The second product packed in the sixth packing bag 104*f* is delivered to the second user 124 by the delivery executive 120.

In one embodiment, the second user 124 may return the sixth packing bag 104*f* to the delivery executive 120 at the time of delivery of the packed second product. In another embodiment, the second user 124 may return the sixth packing bag 104*f* to the same delivery executive 120 or a different delivery executive who has come to deliver another product to the second user 124. When the second user 124 submits the sixth packing bag 104*f*, the delivery executive 120 may utilize the executive device 122 for reading or scanning the sixth identity tag 106*f* of the sixth packing bag 104*f*. The executive device 122 then transmits the details of the sixth packing bag 104*f* and the second user identifier of the second user 124 to the e-commerce server 118. The e-commerce server 118 then transmits the details of the sixth packing bag 104*f* and the second user identifier of the second user 124 to the processing server 128. In another embodiment, the second user 124 may submit the sixth packing bag 104*f* at the retail store 108 or at the recycling station. In another embodiment, the second user 124 may reuse the sixth packing bag 104*f* at a retail store (for example, the retail store 108).

Based on the reuse or submission of the sixth packing bag 104*f*, reward points are credited to a second reward point account of the second user 124. The second user 124 may redeem the added reward points against subsequent purchases at retail stores (such as the retail store 108), e-commerce applications, or the like. For example, when the second user 124 redeems the reward points against an e-commerce purchase, the e-commerce server 118 may communicate a second redemption request to the processing server 128. The second redemption request may include the second user identifier or a second account identifier of the second reward point account. In an example, the second account identifier is an account number of the second reward point account. Based on the redemption of the reward points, the second user 124 may get a discount against the purchase, a cashback equivalent to the redeemed reward points, or the like.

The processing server 128 includes suitable logic, circuitry, interfaces, and/or code, executed by the circuitry, for facilitating the reuse or recycling of the packing bags 104. The processing server 128 receives the details of the packing bags 104 from the manufacturing management device 134. The processing server 128 stores the details of the packing bags 104 in the database 130. In the database 130, the processing server 128 maintains a reuse counter (not shown) for each packing bag 104 to keep a track of a number of times (i.e., a reuse count) the respective packing bag 104 is reused. Thus, the reuse count of each packing bag 104 corresponds to a value of the reuse counter of the corresponding packing bag 104.

When the first packing bag 104a is issued to the first user 114 by the retail operative 110, the processing server 128 receives the details of the first packing bag 104a and the first user identifier by way of the retail device 112. Similarly, when the sixth packing bag 104f is issued to the second user 124, the processing server 128 receives the details of the sixth packing bag 104f and the second user identifier by way of the e-commerce server 118. The processing server 128 determines whether the first and second user identifiers are associated with already existing reward point accounts. If the first and second user identifiers are not associated with any existing reward point accounts, the processing server 128 creates the first and second reward point accounts based on the first and second user identifiers, respectively.

The processing server 128 then links the details of the first packing bag 104a to the first user identifier. Similarly, the processing server 128 links the details of the sixth packing bag 104f to the second user identifier. The processing server 128 stores information pertaining to a first link between the first packing bag 104a and the first user identifier, and a second link between the sixth packing bag 104f and the second user identifier in the database 130. In one example, the processing server 128 may create a tabular database having various rows and columns for storing the information pertaining to various links, such as the first and second links. Each row of the tabular database corresponds to a unique link. For example, each row may store the details of an issued packing bag, a reuse count of the issued packing bag, a user identifier of a user to whom the packing bag is issued, and an account identifier of a reward point account of the user.

The processing server 128 is further configured to detect an occurrence of a first event for each issued packing bag. The first event may correspond to the reuse of the issued packing bag or the submission of the issued packing bag for recycling. For example, the processing server 128 may detect the occurrence of the first event for the first packing bag 104a that is issued to the first user 114, when the first user 114 reuses the first packing bag 104a or submits the first packing bag 104a for recycling. Likewise, the processing server 128 may detect the occurrence of the first event for the sixth packing bag 104f that is issued to the second user 124, when the second user 124 reuses the sixth packing bag 104f or submits the sixth packing bag 104f for recycling.

Based on the detection of the first event for an issued packing bag, the processing server 128 increments the reuse counter associated with the issued packing bag. The processing server 128 further identifies a reward point account associated with the issued packing bag, and credits reward points to the identified reward point account. The processing server 128 may credit the reward points based on the reuse count and the maximum reuse count of the issued packing bag. For example, a count of reward points that are credited, when the incremented reuse count exceeds the maximum reuse count, is more than a count of reward points that are credited when the incremented reuse count is less than the maximum reuse count. In one embodiment, the processing server 128 may further credit the reward points based on the minimum reuse count of the issued packing bag, such that the reward points are credited only when the reuse count is greater than or equal to the minimum reuse count.

The processing server 128 further facilitates the redemption of the reward points earned by the users (for example, the first and second users 114 and 124). The processing server 128 receives the first and second redemption requests by way of the retail device 112, the e-commerce server 118, or any other platform that facilitates the reward point redemption. Based on the first and second redemption requests, the processing server 128 identifies the respective reward point accounts. The processing server 128 then initiates the redemption of the reward points by debiting the reward points from the respective reward point accounts.

The processing server 128 may be maintained by the retail store 108, the e-commerce application, or a third-party service provider. When the processing server 128 is maintained by the e-commerce application, the functionalities of the processing server 128 may be integrated into the e-commerce server 118. Examples of the processing server 128 may include, but are not limited to, personal computers, laptops, mini-computers, mainframe computers, any non-transient and tangible machine that can execute a machine-readable code, cloud-based servers, distributed server networks, or a network of computer systems. The processing server 128 may be realized through various web-based technologies such as, but not limited to, a Java web-framework, a .NET framework, a PHP framework, or any other web-application framework.

The database 130 includes suitable logic, circuitry, and/or interfaces to store the details of the packing bags 104. The database 130 further stores the tabular database and the reuse counter for each packing bag 104. Examples of the database 130 include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the database 130 working in conjunction with the processing server 128, as described herein. In another embodiment, the database 130 may be realized in form of a memory (shown later in FIG. 7) in the processing server 128, without departing from the scope of the disclosure.

The communication network 132 is a medium through which content and messages are transmitted between the retail device 112, the e-commerce server 118, the executive device 122, the user device 126, the processing server 128, and the manufacturing management device 134, or other entities in the in the environment 100. Examples of the communication networks 132 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 132 in accordance with various wired and wireless communication protocols, such as Transmission Control Protocol and Internet Protocol (TCP/IP), User Datagram Protocol (UDP), Long Term Evolution (LTE) communication protocols, or any combination thereof.

FIG. 2A is a block diagram that illustrates a first exemplary packing bag, in accordance with an exemplary embodiment of the disclosure. The first exemplary packing bag of FIG. 2A corresponds to the second packing bag 104b. However, it will be apparent to a person skilled in the art that the first and third through tenth packing bags 104a and 104c-104j may be structurally and functionally similar to the second packing bag 104b. The second packing bag 104b (as shown in FIG. 2A) is cylindrical in shape and has a top lid 202.

FIG. 2B is a block diagram that illustrates a second exemplary packing bag, in accordance with another exemplary embodiment of the disclosure. The second exemplary packing bag of FIG. 2B corresponds to the seventh packing bag 104g. However, it will be apparent to a person skilled in the art that the first through sixth packing bags 104a-104f and the eighth through tenth packing bags 104h-104j may be structurally and functionally similar to the seventh packing bag 104g. As shown in FIG. 2B, the seventh packing bag 104g may be formed from a bubble-wrap material. Thus, the seventh packing bag 104g may be used for packing brittle products or products that are required to be handled with care.

FIG. 3 is a process flow diagram 300 that illustrates an exemplary scenario for distributing the packing bags 104, in accordance with an exemplary embodiment of the disclosure. The packing bags 104 are manufactured at the manufacturing unit 102 (as shown by arrow 302) and the identity tags 106 are assigned to the packing bags 104 (as shown by arrow 304). Each identity tag 106 stores the details of the corresponding packing bag 104. The details of each packing bag 104 may include, but are not limited to, the name and address of the manufacturer of the corresponding packing bag 104, the manufacturing date of the corresponding packing bag 104, the packing bag identifier of the corresponding packing bag 104, and the minimum and maximum reuse counts of the corresponding packing bag 104.

The manufacturing management device 134 transmits the details of each packing bag 104 to the processing server 128 (as shown by arrow 306). The processing server 128 stores the details of each packing bag 104 in a memory (as shown by arrow 308). For example, the processing server 128 may store the details of each packing bag 104 in the database 130. The processing server 128 thus maintains the details of the packing bags 104 manufactured at the manufacturing unit 102. The packing bags 104 are distributed to the various retail stores, storage facilities, and the like. For example, the first through fifth packing bags 104a-104e are distributed to the retail store 108 (as shown by arrow 310), and the sixth through tenth packing bags 104f-104j are distributed to the storage facility 116 (as shown by arrow 312).

Figure 4A:
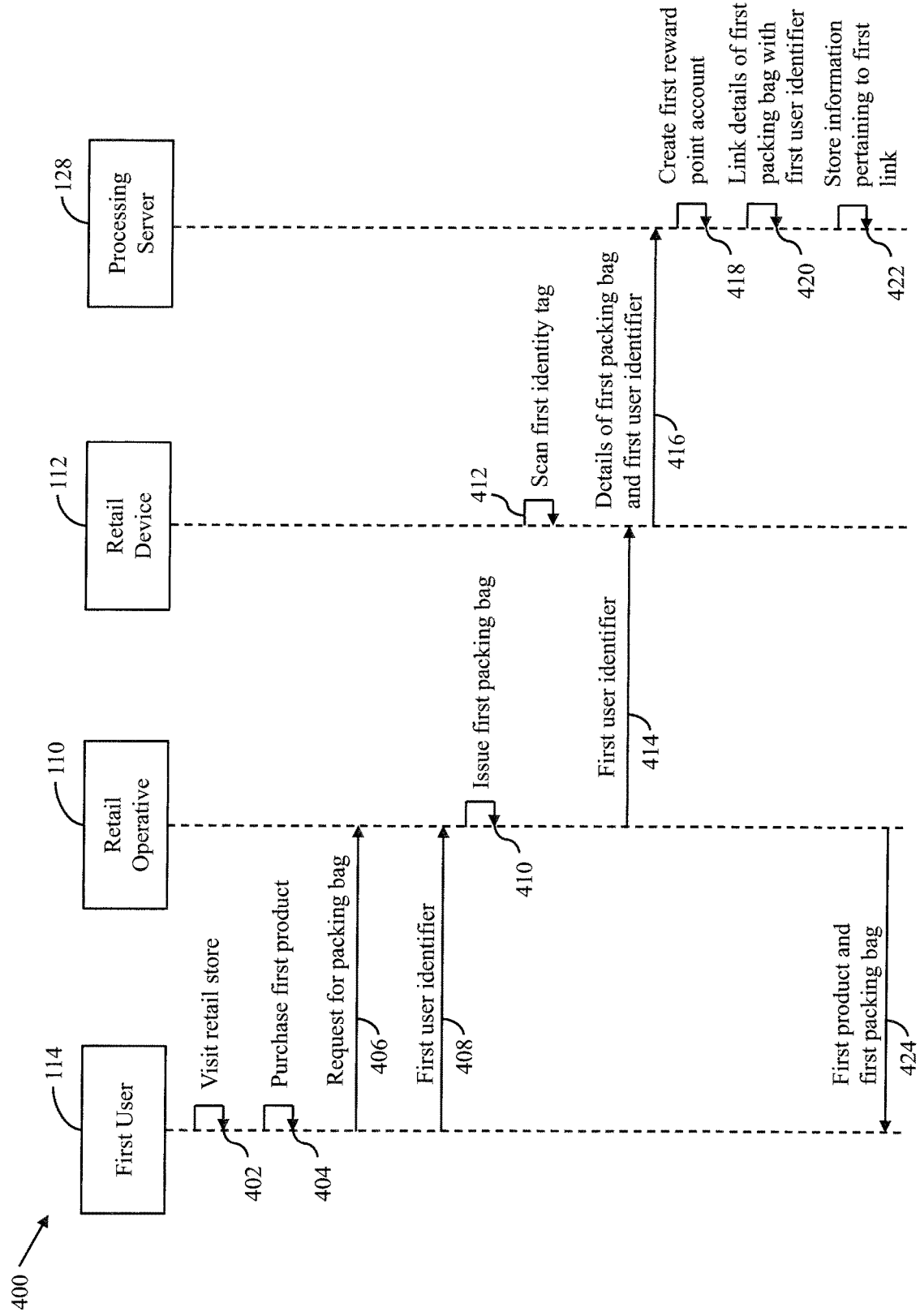
FIG. 4A is a process flow diagram that illustrates an exemplary scenario for issuing a first packing bag to a first user at a retail store of the environment of FIG. 1, in accordance with an exemplary embodiment of the disclosure.

FIG. 4A is a process flow diagram 400 that illustrates an exemplary scenario for issuing the first packing bag 104a to the first user 114 at the retail store 108, in accordance with an exemplary embodiment of the disclosure. The first user 114 visits the retail store 108 for making a retail purchase (as shown by arrow 402). The first user 114 selects and purchases the first product (as shown by arrow 404). Upon purchasing the first product, the first user 114 requests the retail operative 110 for a packing bag (as shown by arrow 406). The first user 114 also provides the first user identifier to the retail operative 110 (as shown by arrow 408). The retail operative 110 selects, from the first through fifth packing bags 104a-104e available at the retail store 108, the first packing bag 104a for issuing to the first user 114 (as shown by arrow 410). The retail device 112 is then utilized by the retail operative 110 to scan the first identity tag 106a of the first packing bag 104a (as shown by arrow 412). The retail device 112 thus receives the details of the first packing bag 104a. The retail operative 110 provides the first user identifier of the first user 114 to the retail device 112 (as shown by arrow 414).

The retail device 112 transmits the details of the first packing bag 104a and the first user identifier to the processing server 128 (as shown by arrow 416). The processing server 128 determines whether the first user identifier is associated with an already existing reward point account. In one example, the processing server 128 may determine that the first user identifier is not associated with any existing reward point account. In such a scenario, the processing server 128 creates the first reward point account of the first user 114 (as shown by arrow 418). The processing server 128 links the details of the first packing bag 104a with the first user identifier of the first user 114 (as shown by arrow 420). The processing server 128 stores the information pertaining to the first link between the first packing bag 104a and the first user identifier in a memory (as shown by arrow 422). In an example, the information pertaining to the first link between the first packing bag 104a and the first user identifier is stored in the database 130. The processing server 128 adds a row to the tabular database such that the added row includes the details of the first packing bag 104a, the reuse count of the first packing bag 104a, the first user identifier, and the first account identifier of the first reward point account. The reuse count has an initial value '0' and may be incremented with each reuse of the first packing bag 104a. The retail operative 110 then hands over the first product and the first packing bag 104a to the first user 114 (as shown by arrow 424).

Figure 4B:
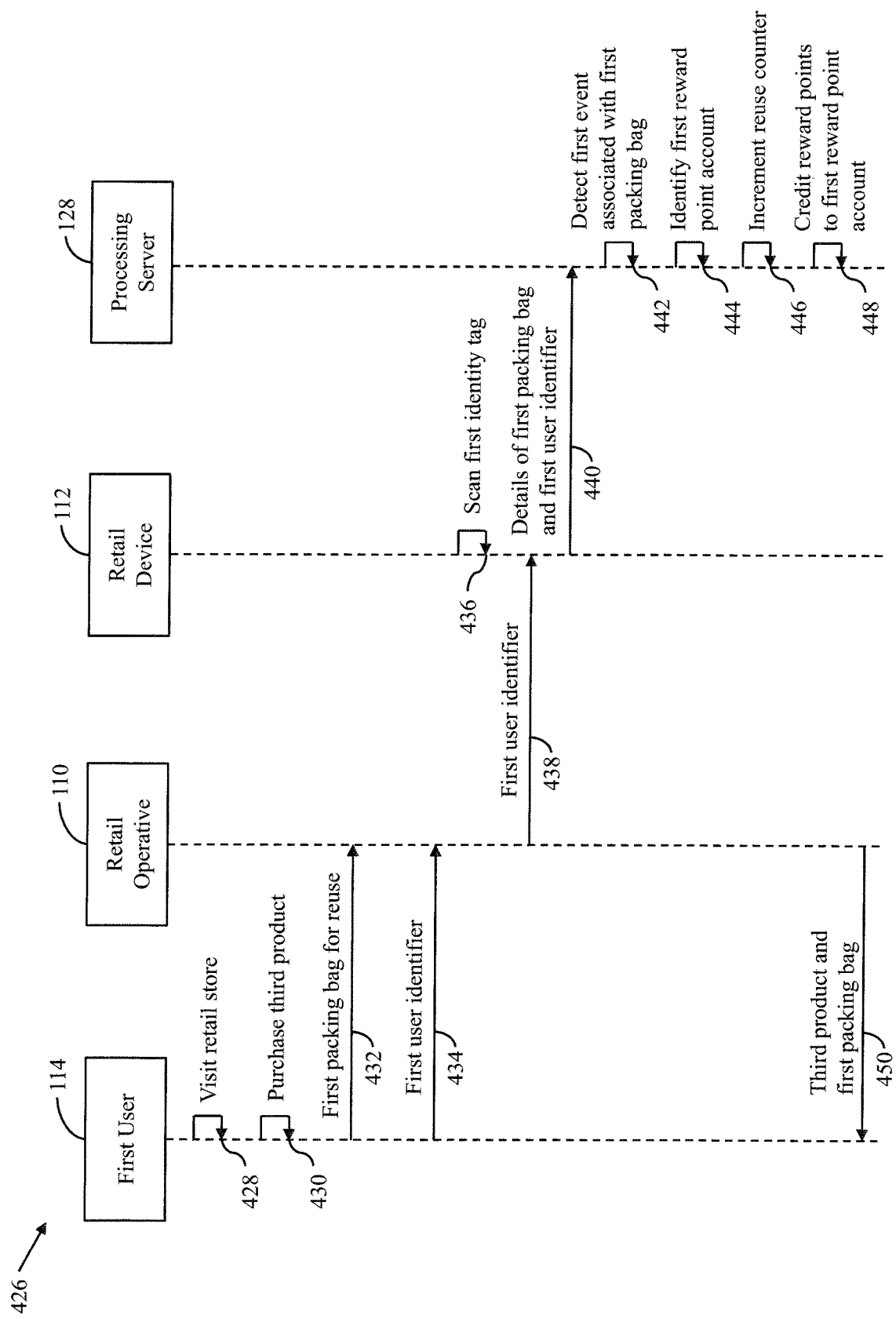
FIG. 4B is a process flow diagram that illustrates an exemplary scenario where the first packing bag is reused, in accordance with an exemplary embodiment of the disclosure.

FIG. 4B is a process flow diagram 426 that illustrates an exemplary scenario where the first packing bag 104a is reused, in accordance with an exemplary embodiment of the disclosure. FIG. 4B is described in conjunction with FIG. 4A.

The first user 114 may visit a retail store (for example, the retail store 108) for making another retail purchase (as shown by arrow 428). The first user 114 selects and purchases a third product (as shown by arrow 430). Upon purchasing the third product, the first user 114 reuses the first packing bag 104a for carrying the purchased product and provides the first packing bag 104a to the retail operative 110 (as shown by arrow 432). The first user 114 further provides the first user identifier to the retail operative 110 (as shown by arrow 434). The retail device 112 is then utilized by the retail operative 110 to scan the first identity tag 106a of the first packing bag 104a (as shown by arrow 436). The retail device 112 thus receives the details of the first packing bag 104a. The retail operative 110 further provides the first user identifier of the first user 114 to the retail device 112 (as shown by arrow 438). The retail device 112 transmits the details of the first packing bag 104a and the first user identifier to the processing server 128 (as shown by arrow 440).

The processing server 128 detects the first event associated with the first packing bag 104a (as shown by arrow 442) based on the reception of the details of the first packing bag 104a and the first user identifier. For example, the processing server 128 detects that the first packing bag 104a is reused at the retail store 108. The processing server 128 identifies the first reward point account associated with the first user identifier (as shown by arrow 444). For example, the processing server 128 may refer to the tabular database stored in the database 130. By using the details of the first packing bag 104a and the first user identifier, the processing server 128 may access the information pertaining to the first link between the first packing bag 104a and the first user identifier for identifying the first reward point account. The processing server 128 then increments the reuse counter associated with the first packing bag 104a (as shown by arrow 446). Increment in the reuse counter indicates that the first packing bag 104a is reused by the first user 114 to whom the first packing bag 104a was issued.

The processing server 128 credits the reward points associated with the reuse of the first packing bag 104a to the first reward point account (as shown by arrow 448). The processing server 128 may credit the reward points based on the reuse count and the maximum reuse count of the first packing bag 104a. In one exemplary scenario, a count of reward points that are credited, when the incremented reuse count exceeds the maximum reuse count, is more than a count of reward points that are credited when the incremented reuse count is less than or equal to the maximum reuse count. In another exemplary scenario, the reward points credited to the first reward point account increases with each reuse of the first packing bag 104a. For example, the reward points credited for a fifth reuse of the first packing bag 104a are more than the reward points credited for a fourth reuse. Additionally, if the maximum reuse count of the first packing bag 104a is 10, the reward points credited for an eleventh reuse of the first packing bag 104a is significantly more than (e.g., two times, three times, or the like) the reward points credited for the tenth reuse. In another exemplary scenario, the processing server 128 may further credit the reward points based on the minimum reuse count of the first packing bag 104a, such that the reward points are credited only when the reuse count is greater than or equal to the minimum reuse count of the first packing bag 104a. The first user 114 thus earns the reward points by reusing the first packing bag 104a. The retail operative 110 then hands over the purchased third product and the first packing bag 104a to the first user 114 (as shown by arrow 450).

Although the present disclosure describes that the first user 114 provides the first user identifier while reusing the first packing bag 104a, the scope of the present disclosure is not limited to it. In an alternate embodiment, the first user 114 may provide the first packing bag 104a, and the processing server 128 may identify the first user identifier and the first account identifier by referring to the tabular database stored in the database 130. For example, by using the details of the first packing bag 104a, the processing server 128 may access the information pertaining to the first link and identify the first user identifier and the first account identifier. Consequently, the processing server 128 identifies the first reward point account associated with the first user identifier or the first account identifier.

Figure 5A:
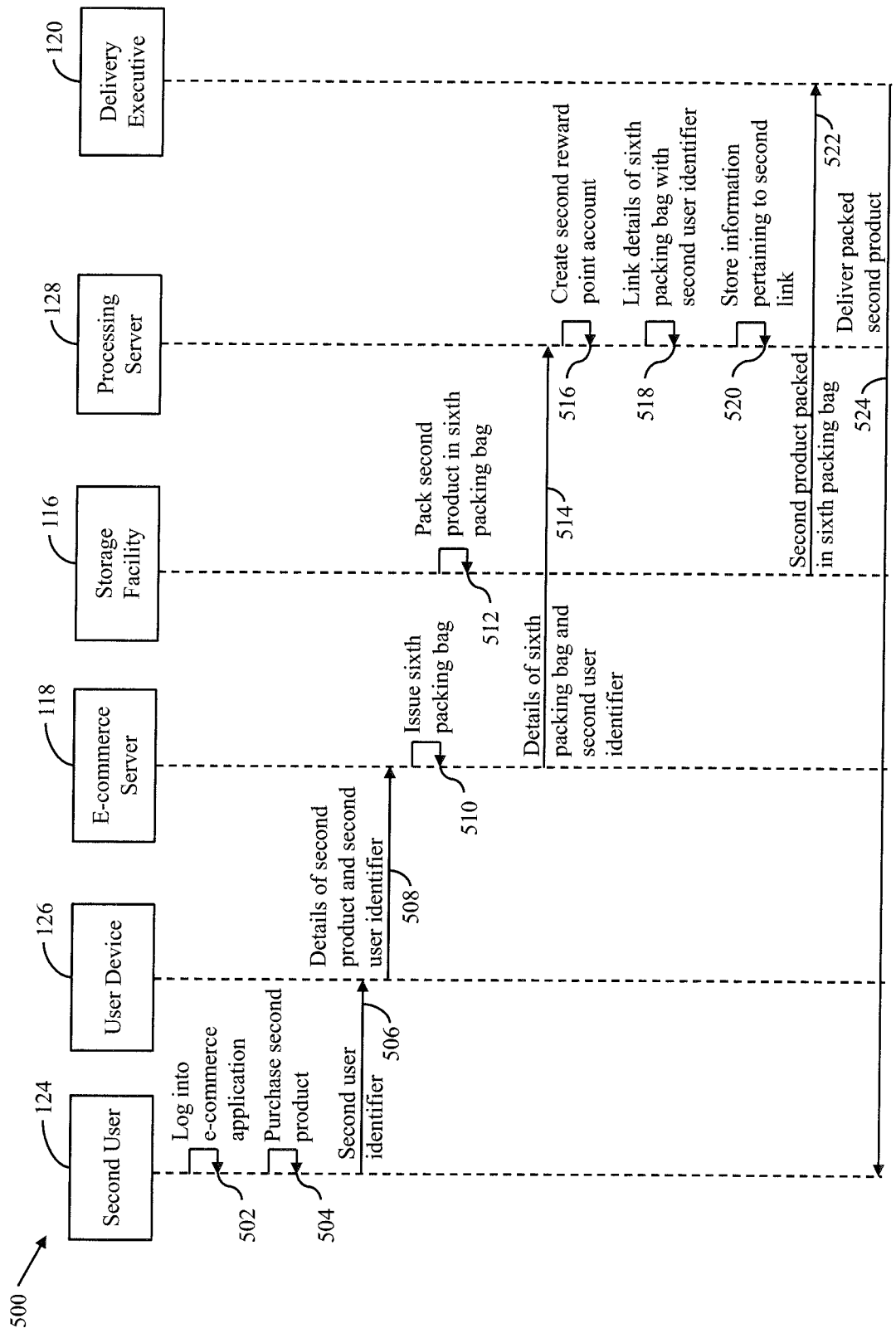
FIG. 5A is a process flow diagram that illustrates an exemplary scenario for issuing a sixth packing bag to a second user of the environment of FIG. 1 for an e-commerce purchase, in accordance with another exemplary embodiment of the disclosure.

FIG. 5A is a process flow diagram 500 that illustrates an exemplary scenario for issuing the sixth packing bag 104f to the second user 124 for an e-commerce purchase, in accordance with another exemplary embodiment of the disclosure. The second user 124 utilizes the user device 126 to log into the e-commerce application hosted by the e-commerce server 118 (as shown by arrow 502). The second user 124 selects and purchases the second product (as shown by arrow 504). The second user 124 further provides the second user identifier to the user device 126 (as shown by arrow 506). The user device 126 transmits the second user identifier and details of the purchased product to the e-commerce server 118 (as shown by arrow 508). The details of the purchased product include a purchase amount, a payment mode, a date of purchase, and/or the like.

The e-commerce server 118 selects the sixth packing bag 104f, from the sixth through tenth packing bags 104f-104j available at the storage facility 116, for issuing to the second user 124 (as shown by arrow 510). The second product is packed in the sixth packing bag 104f at the storage facility 116 (as shown by arrow 512). The e-commerce server 118 transmits the details of the sixth packing bag 104f and the second user identifier to the processing server 128 (as shown by arrow 514). The processing server 128 determines whether the second user identifier is associated with an already existing reward point account. In one example, the processing server 128 may determine that the second user identifier is not associated with any existing reward point account. In such a scenario, the processing server 128 creates the second reward point account of the second user 124 (as shown by arrow 516). The processing server 128 links the details of the sixth packing bag 104f with the second user identifier (as shown by arrow 518). The processing server 128 stores the information pertaining to the second link between the sixth packing bag 104f and the second user identifier in a memory (as shown by arrow 520). In one example, the information pertaining to the second link between the sixth packing bag 104f and the second user identifier is stored in the database 130. The second product packed in the sixth packing bag 104f is picked up from the storage facility 116 by the delivery executive 120 (as shown by arrow 522). The delivery executive 120 delivers the package (i.e., the second product packed in sixth packing bag 104f) to the second user 124 (as shown by arrow 524). Hence, the sixth packing bag 104f is issued to the second user 124.

Figure 5B:
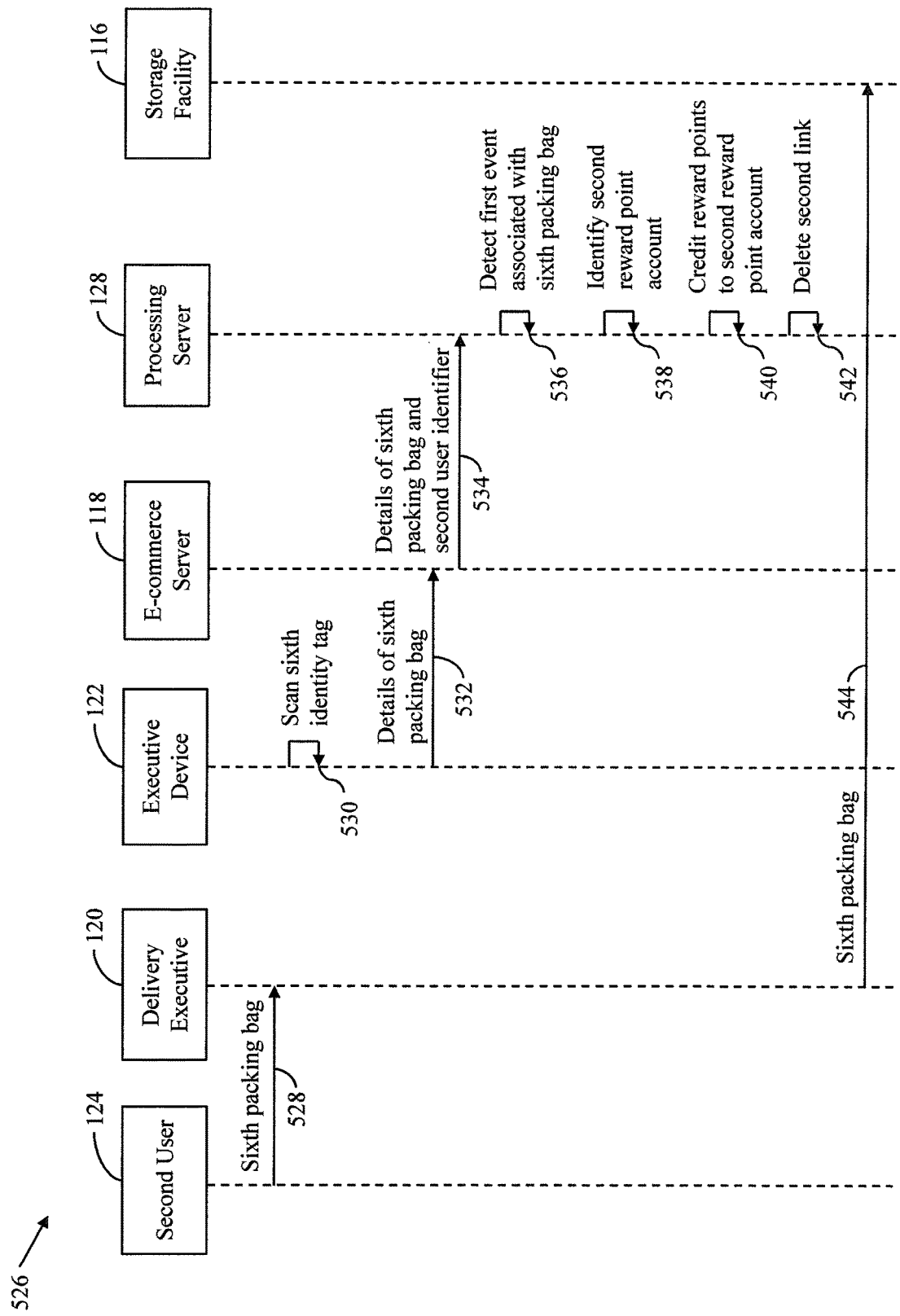
FIG. 5B is a process flow diagram that illustrates an exemplary scenario where the sixth packing bag is returned to a delivery executive of the environment of FIG. 1, in accordance with an exemplary embodiment of the disclosure.

FIG. 5B is a process flow diagram 526 that illustrates an exemplary scenario where the sixth packing bag 104f is returned to the delivery executive 120, in accordance with an exemplary embodiment of the disclosure. FIG. 5B is described in conjunction with FIG. 5A.

Upon receiving the package (i.e., the purchased product packed in the sixth packing bag 104f) from the delivery executive 120, the second user 124 returns (or submits) the sixth packing bag 104f to the delivery executive 120 (as shown by arrow 528). The executive device 122 is then utilized by the delivery executive 120 to scan the sixth identity tag 106f of the sixth packing bag 104f (as shown by arrow 530). The executive device 122 thus receives the details of the sixth packing bag 104f. The executive device 122 transmits the details of the sixth packing bag 104f to the e-commerce server 118 (as shown by arrow 532). The e-commerce server 118 transmits the details of the sixth packing bag 104f and the second user identifier, received during the issuance of the sixth packing bag 104f, to the processing server 128 (as shown by arrow 534).

The processing server 128 detects the first event associated with the sixth packing bag 104f (as shown by arrow 536) based on the reception of the details of the sixth packing bag 104f and the second user identifier. For example, the processing server 128 detects that the sixth packing bag 104f is returned (or submitted) to the delivery executive 120. The processing server 128 identifies the second reward point account associated with the second user identifier (as shown by arrow 538).

Although the present disclosure describes that the e-commerce server 118 transmits the second user identifier along with the details of the sixth packing bag 104f to the processing server 128, the scope of the present disclosure is not limited to it. In an alternate embodiment, the e-commerce server 118 may transmit the details of the sixth packing bag 104f, and the processing server 128 may identify the second user identifier and the second account identifier by referring to the tabular database stored in the database 130. For example, by using the details of the sixth packing bag 104f, the processing server 128 may access the information pertaining to the second link and identify the second user identifier and the second account identifier. Consequently, the processing server 128 identifies the second reward point account associated with the second user identifier or the second account identifier.

The processing server 128 credits the reward points associated with the return of the sixth packing bag 104f to the second reward point account (as shown by arrow 540). Thus, the second user 124 earns the reward points by returning the sixth packing bag 104f. The processing server 128 may then delete the second link between the sixth packing bag 104f and the second user identifier (as shown by arrow 542). The deletion of the second link corresponds to deletion of the second user identifier and the second account identifier from the row of the tabular database associated with the sixth packing bag 104f. However, the reuse count of the sixth packing bag 104f is maintained in the database 130. The delivery executive 120 delivers the returned sixth packing bag 104f to the storage facility 116 (as shown by arrow 544). The sixth packing bag 104f may then be reissued to another user who makes an e-commerce purchase from the e-commerce application or recycled. The sixth packing bag 104f may be reissued or recycled based on a physical condition of the sixth packing bag 104f.

Although the present disclosure describes that the second user 124 returns the sixth packing bag 104f upon delivery of the second product, the scope of the present disclosure is not limited to it. In an alternate embodiment, the second user 124 may return the sixth packing bag 104f to the same delivery executive 120 or a different delivery executive who has come to deliver a fourth product purchased online by the second user 124, without the deviating from the scope of the disclosure.

It will be apparent to a person skilled in the art that the scope of the present disclosure is not limited to the e-commerce applications. In various other embodiments, the sixth packing bag 104f may be utilized for delivering food items to the second user 124, without departing from the scope of the disclosure.

Figure 6A:
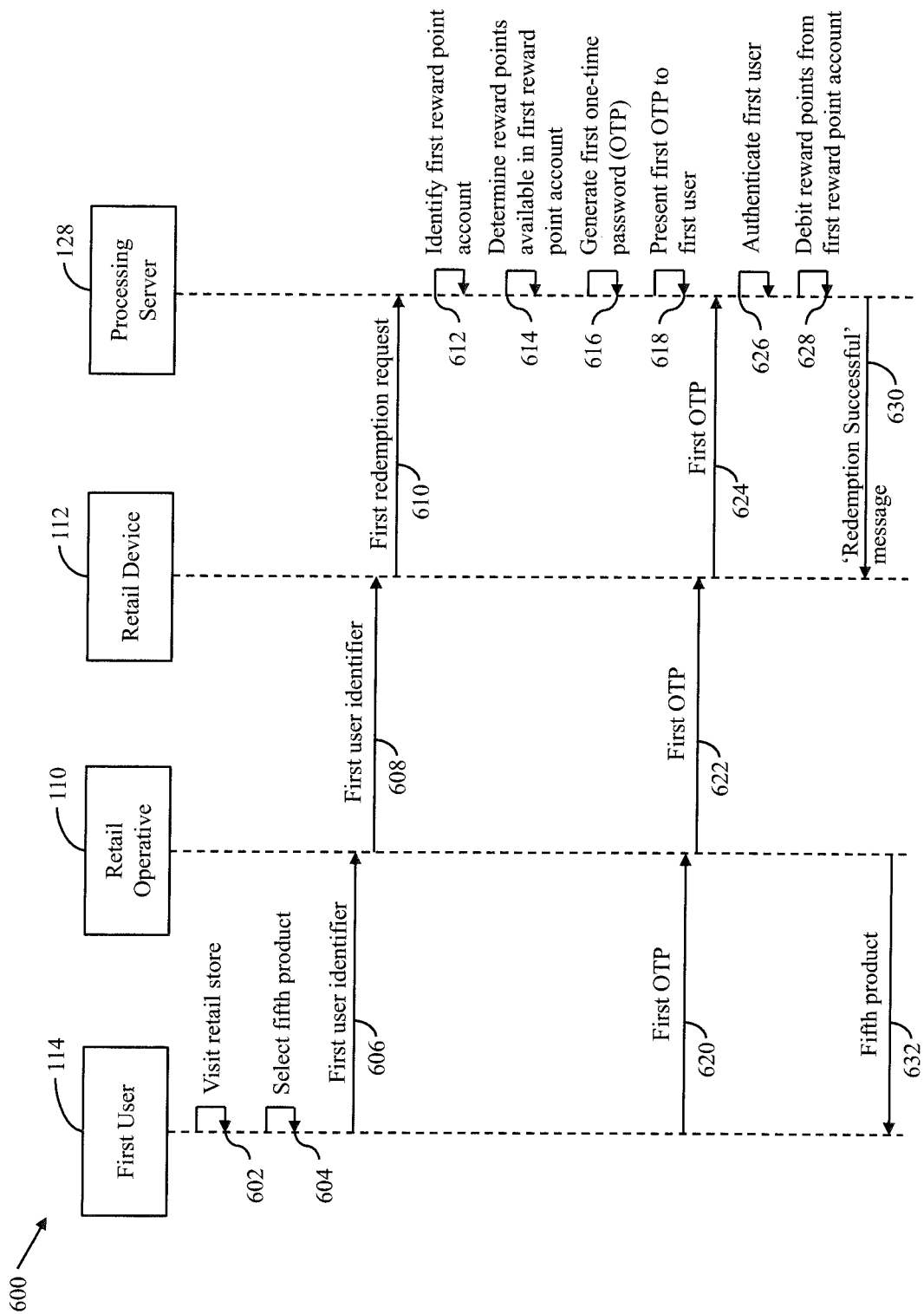
FIG. 6A is a process flow diagram that illustrates an exemplary scenario for redeeming reward points associated with a first reward point account of the first user, in accordance with an exemplary embodiment of the disclosure.

FIG. 6A is a process flow diagram 600 that illustrates an exemplary scenario for redeeming the reward points associated with the first reward point account of the first user 114, in accordance with an exemplary embodiment of the disclosure. The first user 114 may redeem the reward points against another retail purchase, an e-commerce purchase, or any other purchase that allows reward point redemption. For the sake of brevity, it is assumed that the first user 114 redeems the reward points against a retail purchase of a fifth product at the retail store 108.

The first user 114 visits the retail store 108 for making a retail purchase (as shown by arrow 602). The first user 114 selects the fifth product for purchasing (as shown by arrow 604). The first user 114 further provides the first user identifier to the retail operative 110 for initiating redemption of reward points from the first reward point account (as shown by arrow 606). Alternatively, the first user 114 may provide the first account identifier to the retail operative 110 for initiating redemption of reward points from the first reward point account. The retail operative 110 further provides the first user identifier (or the first account identifier) of the first user 114 to the retail device 112 (as shown by arrow 608). The retail device 112 transmits the first redemption request including the first user identifier to the processing server 128 (as shown by arrow 610).

The processing server 128 identifies, based on the first redemption request, the first reward point account associated with the first user identifier (or the first account identifier) (as shown by arrow 612). The processing server 128 then determines the reward points available in the first reward point account of the first user 114 (as shown by arrow 614). The processing server 128 generates a first one-time password (OTP) to authenticate the first user 114 (as shown by arrow 616). The processing server 128 presents the first OTP to the first user 114 by way of a user device (not shown) of the first user 114 (as shown by arrow 618). The first user 114 provides the first OTP to the retail operative 110 (as shown by arrow 620) and the retail operative 110 provides the first OTP to the retail device 112 (as shown by arrow 622). The retail device 112 communicates the first OTP to the processing server 128 (as shown by arrow 624).

The processing server 128 authenticates the first user 114 based on the first OTP received from the retail device 112 (as shown by arrow 626). In an example, the processing server 128 compares the first OTP presented to the first user 114 with the received first OTP. If the presented first OTP matches the received first OTP, the first user 114 is authenticated. Based on the authentication of the first user 114, the processing server 128 debits the reward points from the first reward point account (as shown by arrow 628). In an embodiment, all available reward points are debited. In another embodiment, a part of the available reward points is debited, where the part of the available reward points to be debited is determined based on a purchase amount of the fifth product. The processing server 128 further transmits a 'Redemption Successful' message to the retail device 112 (as shown by arrow 630). Additionally, the processing server 128 may transmit the 'Redemption Successful' message to the user device of the first user 114 for presenting to the first user 114. Thus, by redeeming the reward points, the first user 114 avails a discount or a cashback on the retail purchase of the fifth product. The retail operative 110 hands over the purchased fifth product to the first user 114 (as shown by arrow 632).

It will be apparent to a person skilled in the art that reward points from the second reward point account may be redeemed at the retail store 108 in a similar manner as described in the foregoing description of FIG. 6A.

Figure 6B:
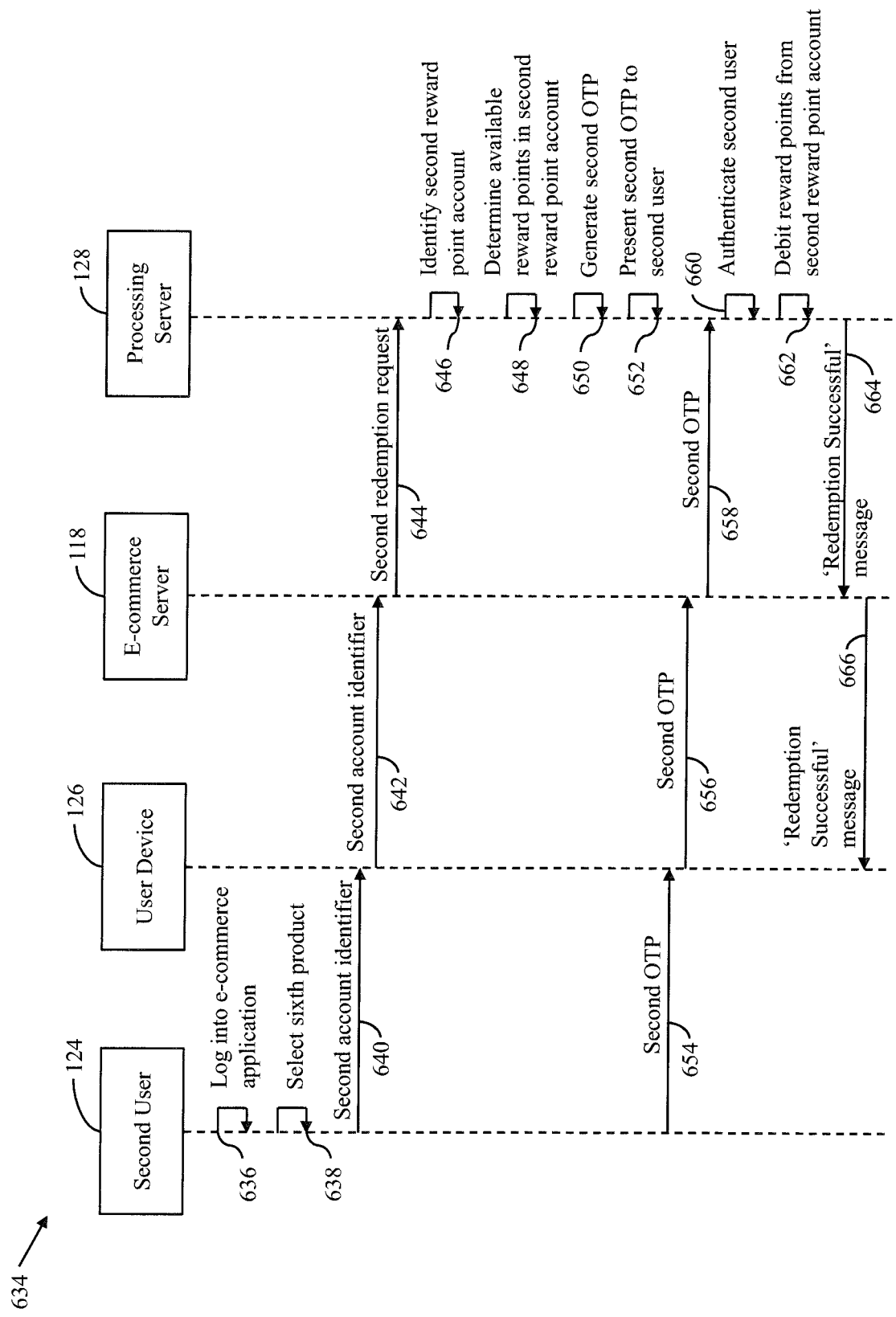
FIG. 6B is a process flow diagram that illustrates an exemplary scenario for redeeming reward points associated with a second reward point account of the second user, in accordance with another exemplary embodiment of the disclosure.

FIG. 6B is a process flow diagram 634 that illustrates an exemplary scenario for redeeming the reward points associated with the second reward point account of the second user 124, in accordance with another exemplary embodiment of the disclosure. The second user 124 may redeem the reward points against another e-commerce purchase, a retail purchase, or any other purchase that allows reward point redemption. For the sake of brevity, it is assumed that the second user 124 redeems the reward points against an e-commerce purchase of a sixth product.

The second user 124 utilizes the user device 126 to log into the e-commerce application hosted by the e-commerce server 118 (as shown by arrow 636). The second user 124 selects a product (e.g., the sixth product) for making the e-commerce purchase (as shown by arrow 638). The second user 124 further provides the second account identifier of the second reward point account to the user device 126 (as shown by arrow 640). Alternatively, the second user 124 may provide the second user identifier to the user device 126. The user device 126 transmits the second account identifier (or the second user identifier) to the e-commerce server 118 (as shown by arrow 642). The e-commerce server 118 transmits the second redemption request including the second account identifier to the processing server 128 (as shown by arrow 644).

The processing server 128 identifies, based on the second redemption request, the second reward point account associated with the second account identifier (as shown by arrow 646). The processing server 128 then determines the reward points available in the second reward point account of the second user 124 (as shown by arrow 648). The processing server 128 generates a second OTP to authenticate the second user 124 (as shown by arrow 650). The processing server 128 presents the second OTP to the second user 124 by way of the user device 126 (as shown by arrow 652) and the second user 124 provides the second OTP to the user device 126 (as shown by arrow 654). The user device 126 communicates the second OTP to the e-commerce server 118 (as shown by arrow 656) and the e-commerce server 118 communicates the second OTP to the processing server 128 (as shown by arrow 658).

The processing server 128 authenticates the second user 124 based on the second OTP received from the e-commerce server 118 (as shown by arrow 660). In an example, the processing server 128 compares the second OTP presented to the second user 124 with the received second OTP. If the presented second OTP matches the received second OTP, the second user 124 is authenticated. Based on the authentication of the second user 124, the processing server 128 debits the reward points from the second reward point account (as shown by arrow 662). In an embodiment, all available reward points are debited. In another embodiment, a part of the available reward points is debited. The processing server 128 further transmits a 'Redemption Successful' message to the e-commerce server 118 (as shown by arrow 664). The e-commerce server 118 further transmits the 'Redemption Successful' message to the user device 126 for presenting to the second user 124 (as shown by arrow 666). Thus, by redeeming the rewards point from reward point account, the second user 124 avails a discount or a cashback on the e-commerce purchase of the sixth product.

It will be apparent to a person skilled in the art that reward points from the first reward point account may be redeemed for an e-commerce purchase in a similar manner as described in the foregoing description of FIG. 6B.

Figure 7:
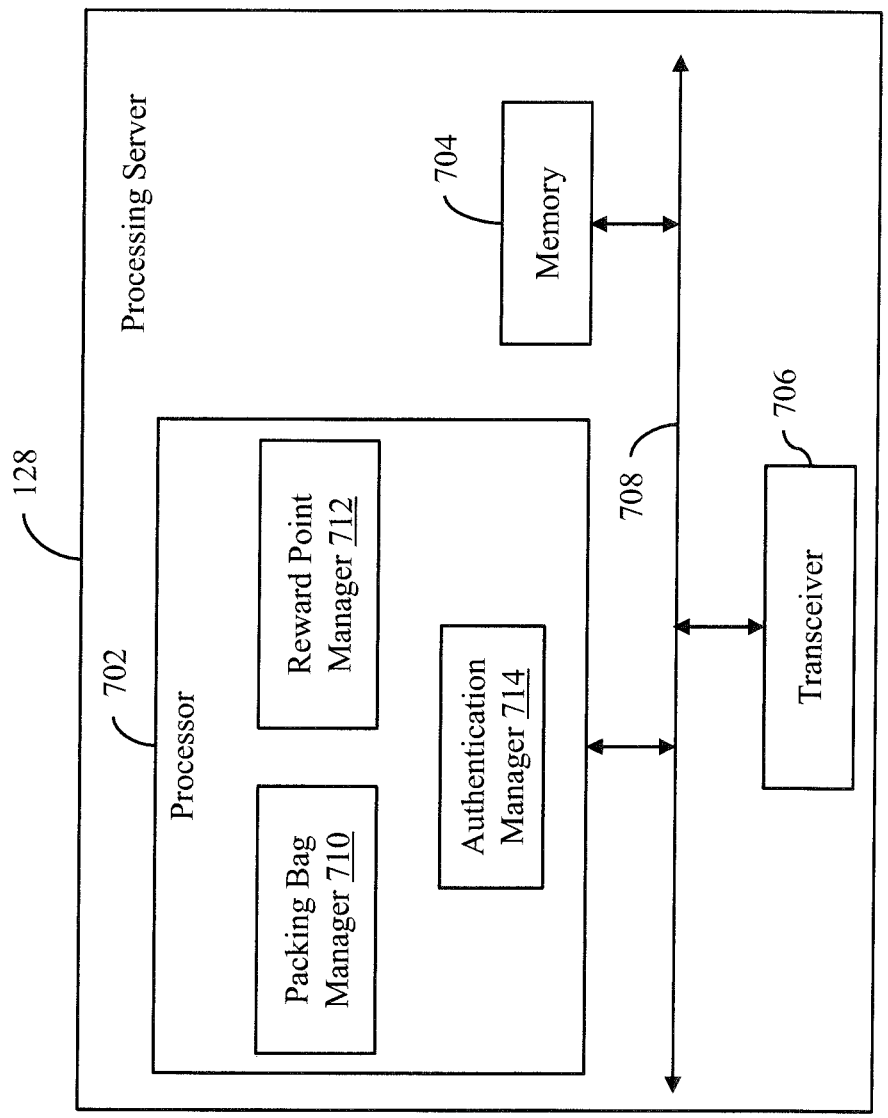
FIG. 7 is a block diagram that illustrates a processing server of the environment of FIG. 1, in accordance with an exemplary embodiment of the disclosure.

FIG. 7 is a block diagram that illustrates the processing server 128, in accordance with an exemplary embodiment of the disclosure. The processing server 128 includes a processor 702, a memory 704, and a transceiver 706. The processor 702, the memory 704, and the transceiver 706 communicate with each other by way of a communication bus 708.

The processor 702 includes suitable logic, circuitry, interfaces, and/or code, executable by the circuitry, for facilitating the reuse or recycling of the packing bags 104, and redemption of reward points earned based on the reuse or recycling of the packing bags 104. Examples of the processor 702 may include, but are not limited to, an application specific integrated circuit (ASIC) processor, a reduced instruction set computer (RISC) processor, a complex instruction set computer (CISC) processor, a field programmable gate array (FPGA), or the like. The processor 702 includes a packing bag manager 710, a reward point manager 712, and an authentication manager 714.

The packing bag manager 710 maintains the details of the packing bags 104 manufactured at the manufacturing unit 102. For example, (as described in FIG. 3), the packing bag manager 710 receives the details of the packing bags 104 from the manufacturing management device 134, and stores the details in the database 130. The packing bag manager 710 further maintains the reuse counter for each packing bag 104 in the database 130.

The packing bag manager 710 maintains the details of packing bags (e.g., the first packing bag 104a or the sixth packing bag 104o that are issued to users (e.g., the first user 114 or the second user 124). As described in FIGS. 4A and 5A, when the packing bag is issued to a user, the packing bag manager 710 receives details of the packing bag, and a user identifier of the user to whom the packing bag is issued. The packing bag manager 710 links the details of the issued packing bag with the user identifier, and stores the information pertaining to the link in the database 130. The packing bag manager 710 detects the occurrence of the first event associated with the packing bag. The first event may correspond to the reuse of the packing bag or submission of the packing bag for recycling.

The reward point manager 712 maintains and manages reward point accounts of various users. As described in FIGS. 4A and 5A. when a packing bag (e.g., the first packing bag 104a or the sixth packing bag 104o is issued to a user, the reward point manager 712 determines whether a user identifier of the user to whom the packing bag is issued is associated with an already existing reward point account. If the user identifier is not associated with any existing reward point account, the reward point manager 712 creates a reward point account of the user based on the user identifier. Based on the detection of the first event for any of the packing bags 104, the reward point manager 712 credits reward points to the corresponding reward point account (as described in FIGS. 4B and 5B). In other words, when a user reuses the issued packing bag or submits the issued packing bag for recycling, the reward point manager 712 credits reward points to the reward point account of the user.

The reward point manager 712 further facilitates redemption reward points from a reward point account. As described in FIGS. 6A and 6B, when the user wants to redeem the reward points from the corresponding reward point account, the reward point manager 712 receives a redemption request including the user identifier of the user or an account identifier of the reward point account of the user. Based on the authentication of the user, the reward point manager 712 initiates the redemption by debiting the reward points from the reward point account.

The authentication manager 714 authenticates the user (for example, the first or second user 114 or 124) when the user wants to redeem reward points from the corresponding reward point account. The authentication manager 714 authenticates the user by generating and presenting an OTP to the user. Based on the authentication of the user, the reward point manager 712 debits the reward points from the reward point account of the user.

It will be apparent to a person skilled in the art that the scope of the disclosure is not limited to realizing the reward point manager 712 in the processing server 128. In various other embodiments, the reward point manager 712 may be external to the processing server 128 and maintained by a third-party service provider who is in partnership with the retail store 108 or the e-commerce application, without departing from the scope of the disclosure.

The memory 704 includes suitable logic, circuitry, and/or interfaces to store one or more instructions that are executed by the processor 702 for performing one or more operations. Additionally, the memory 704 may store the tabular database and the reuse counter for each packing bag 104. Examples of the memory 704 include a RAM, a ROM, a removable storage drive, an HDD, a flash memory, a solid-state memory, and the like.

The transceiver 706 includes suitable logic, circuitry, interfaces and/or code, executable by the circuitry, for transmitting and receiving data over the communication network 132 using one or more communication protocols. The transceiver 706 receives various requests and messages from the retail device 112, the e-commerce server 118, the executive device 122, and the manufacturing management device 134. For example, the transceiver 706 receives the details of the packing bags 104 from the manufacturing management device 134. Additionally, the transceiver 706 receives the details of a packing bag and a user identifier of a user to whom the packing bag is issued, from the retail device 112, the e-commerce server 118, or the executive device 122. The transceiver 706 further receives redemption requests from the retail device 112 or the e-commerce server 118.

The transceiver 706 transmits various requests and messages to a user device of the user, the retail device 112, and the e-commerce server 118. For example, the transceiver 706 transmits OTP to a user device (for example, the user device 126) of the user for authenticating the user. The transceiver 706 further transmits the 'Redemption Successful' message to the retail device 112 and the e-commerce server 118. Examples of the transceiver 706 may include, but are not limited to, an antenna, a radio frequency transceiver, a wireless transceiver, an Ethernet port, a Universal Serial Bus (USB) port, or any other device configured to transmit and receive data.

Figure 8A:
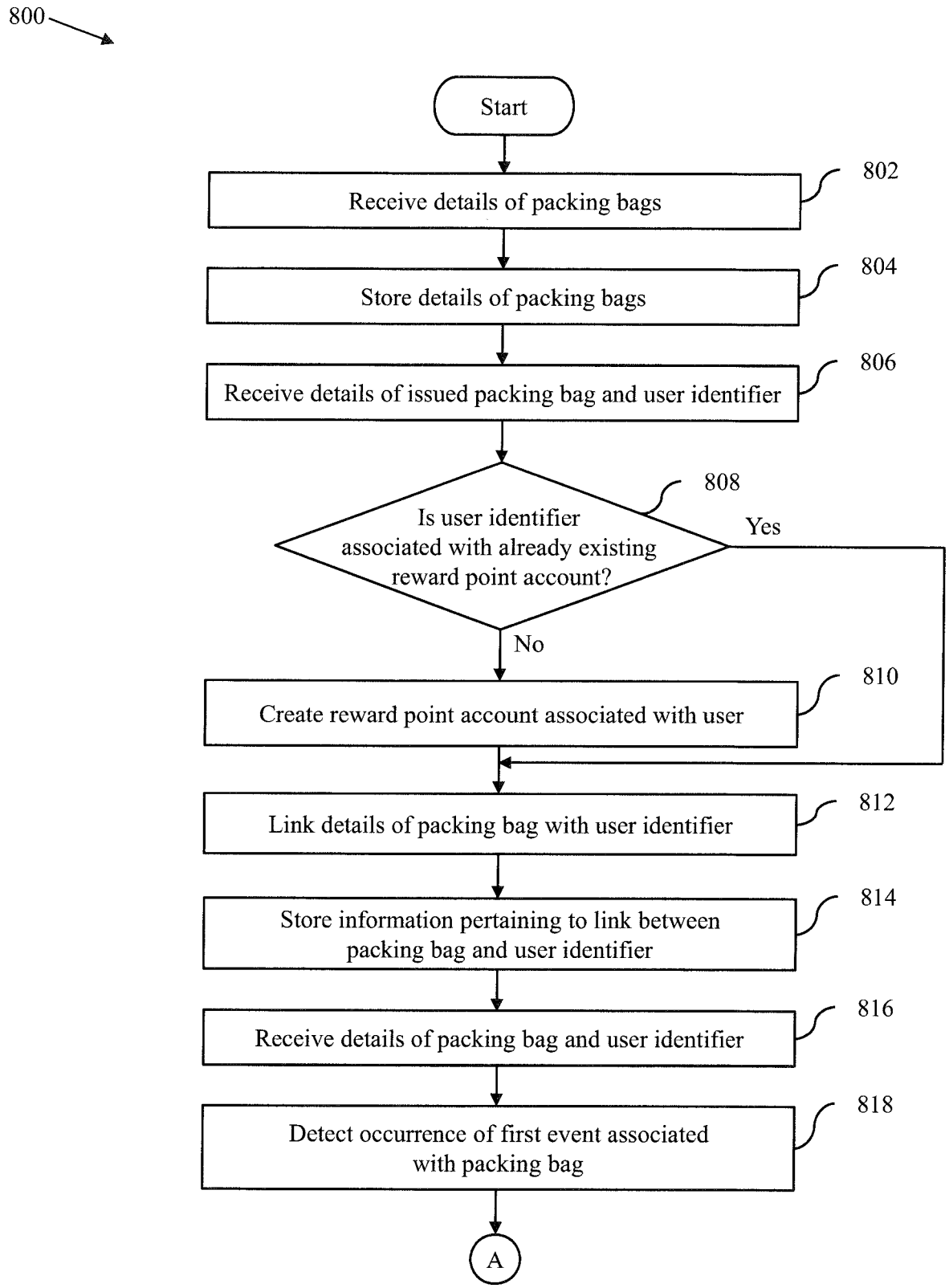
FIGS. 8A and 8B, collectively represent a flowchart that illustrates a method for facilitating reuse or recycling of a packing bag, in accordance with an exemplary embodiment of the disclosure.
Figure 8B:
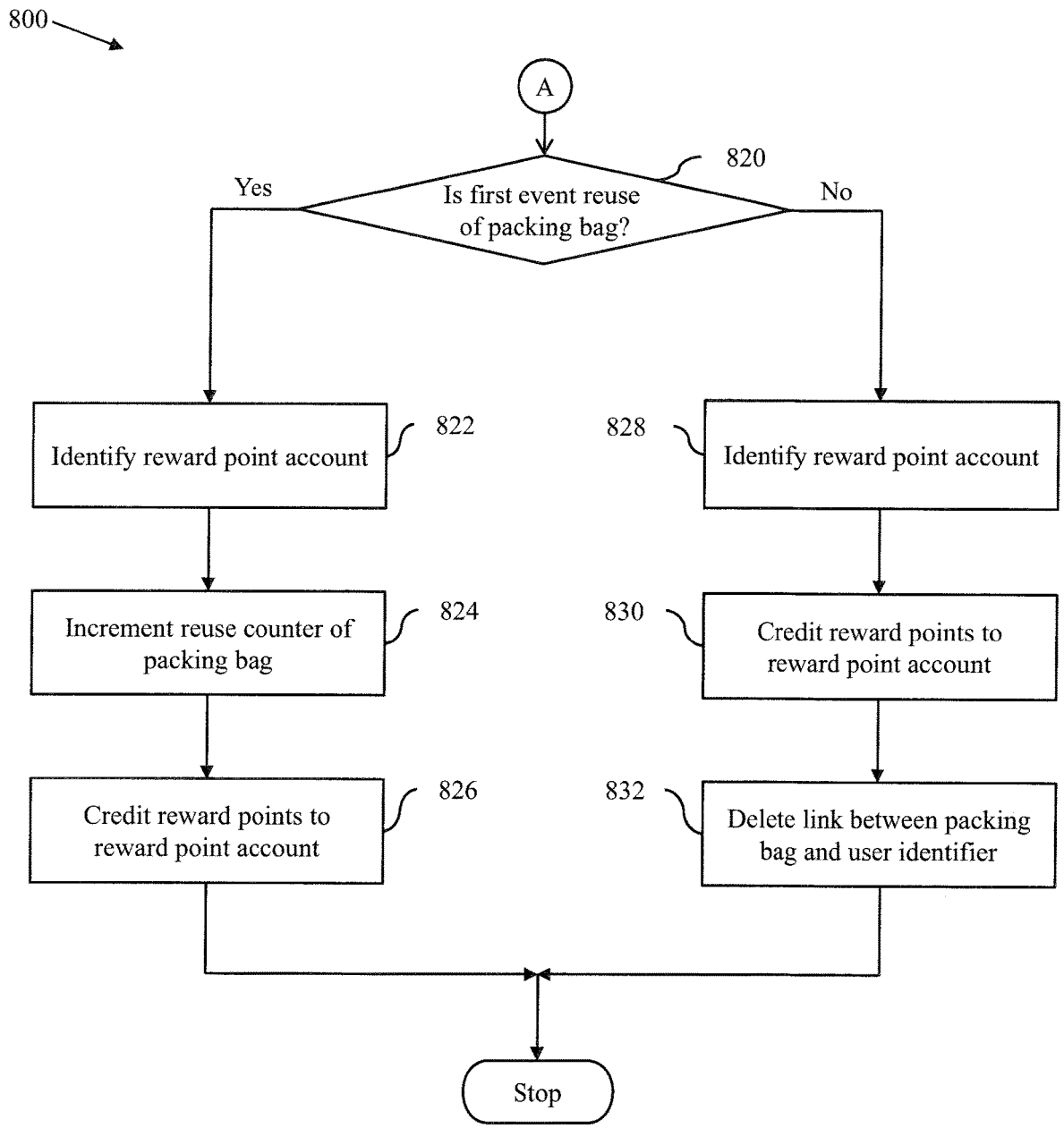

FIGS. 8A and 8B, collectively represent a flowchart 800 that illustrates a method for facilitating reuse or recycling of a packing bag, in accordance with an exemplary embodiment of the disclosure. At step 802, the processing server 128 receives the details of the packing bags 104 manufactured at the manufacturing unit 102, from the manufacturing management device 134. At step 804, the processing server 128 stores the details of the packing bags 104 in the database 130. The packing bags 104 are then distributed to various retail stores, storage facilities, and/or the like. For example, the first through fifth packing bags 104*a*-104*e* are distributed to the retail store 108, and the sixth through tenth packing bags 104*f*-104*j* are distributed to the storage facility 116.

At step 806, the processing server 128 receives the details of an issued packing bag (for example, any of the packing bags 104) and a user identifier of a user to whom the packing bag is issued. In one example, the processing server 128 may receive the first user identifier of the first user 114 and the details of the first packing bag 104*a* issued to the first user 114 from the retail device 112, based on a purchase of a product (e.g., the first product) at the retail store 108. In another example, the processing server 128 may receive the second user identifier of the second user 124 and the details of the sixth packing bag 104*f* issued to the second user 124 from the executive device 122, based on an online purchase of a product (e.g., the second product).

At step 808, the processing server 128 determines whether the user identifier is associated with an already existing reward point account. If at step 808, the processing server 128 determines that the user identifier is not associated with any existing reward point account, step 810 is performed. At step 810, the processing server 128 creates a reward point account associated with the user identifier. If at step 808, the processing server 128 determines that the user identifier is associated with an already existing reward point account, step 812 is performed.

At step 812, the processing server 128 links the details of the issued packing bag with the user identifier. At step 814, the processing server 128 stores the information pertaining to the link between the details of the issued packing bag and the user identifier in the database 130. For example, the processing server 128 may create the tabular database that includes rows and columns for storing the details of the packing bag, the reuse count, the user identifier, and the account identifier of the reward point account. Each row of the tabular database corresponds to a unique link between a packing bag and a user identifier. Upon issuance of the packing bag, the user may reuse the packing bag at a retail store (e.g., the retail store 108), submit the packing bag for recycling at the retail store 108, or return (or submit) the packing bag to a delivery executive (e.g., the delivery executive 120) for recycling.

At step 816, the processing server 128 receives the details of the packing bag and the user identifier. In one example, the processing server 128 receives the details of the first packing bag 104*a* and the first user identifier from the retail device 112, when the first user 114 reuses the first packing bag 104*a* at the retail store 108. In another example, the processing server 128 receives the details of the sixth packing bag 104*f* and the second user identifier from the e-commerce server 118, when the second user 124 returns (or submits) the sixth packing bag 104*f* to the delivery executive 120.

At step 818, the processing server 128 detects the occurrence of the first event associated with the issued packing bag based on the reception of the details of the packing bag and the user identifier. The first event may correspond to one of reuse of the issued packing bag or submission of the issued packing bag for recycling. At step 820, the processing server 128 determines whether the first event is the reuse of the packing bag. If at step 820, the processing server 128 determines that the first event is the reuse of the packing bag, step 822 is performed. At step 822, the processing server 128 identifies the reward point account associated with the user identifier that is linked to the issued packing bag. At step 824, the processing server 128 increments a reuse counter associated with the reused packing bag. Thus, the processing server 128 increments the reuse counter of the reused packing bag. At step 826, the processing server 128 credits reward points to the reward point account associated with the reused packing bag. In one embodiment, the processing server 128 credits the reward points to the reward point account based on the reuse count of the reused packing bag and the maximum reuse count of the reused packing bag. Thus, the user earns reward points by reusing the packing bag.

If at step 820, the processing server 128 determines that the first event is not the reuse of the packing bag, step 828 is performed. Consequently, the first event is determined to be the submission of the issued packing bag for recycling. At step 828, the processing server 128 identifies the reward point account associated with the user identifier that is linked to the issued packing bag. At step 830, the processing server 128 credits reward points to the reward point account associated with the submitted packing bag. Thus, the user earns reward points by submitting (or returning) the packing bag for recycling. At step 832, the processing server 128 deletes the link between the submitted packing bag and the user identifier. The submitted packing bag may be recycled or reissued to another user based on the physical condition of the submitted packing bag.

Figure 9:
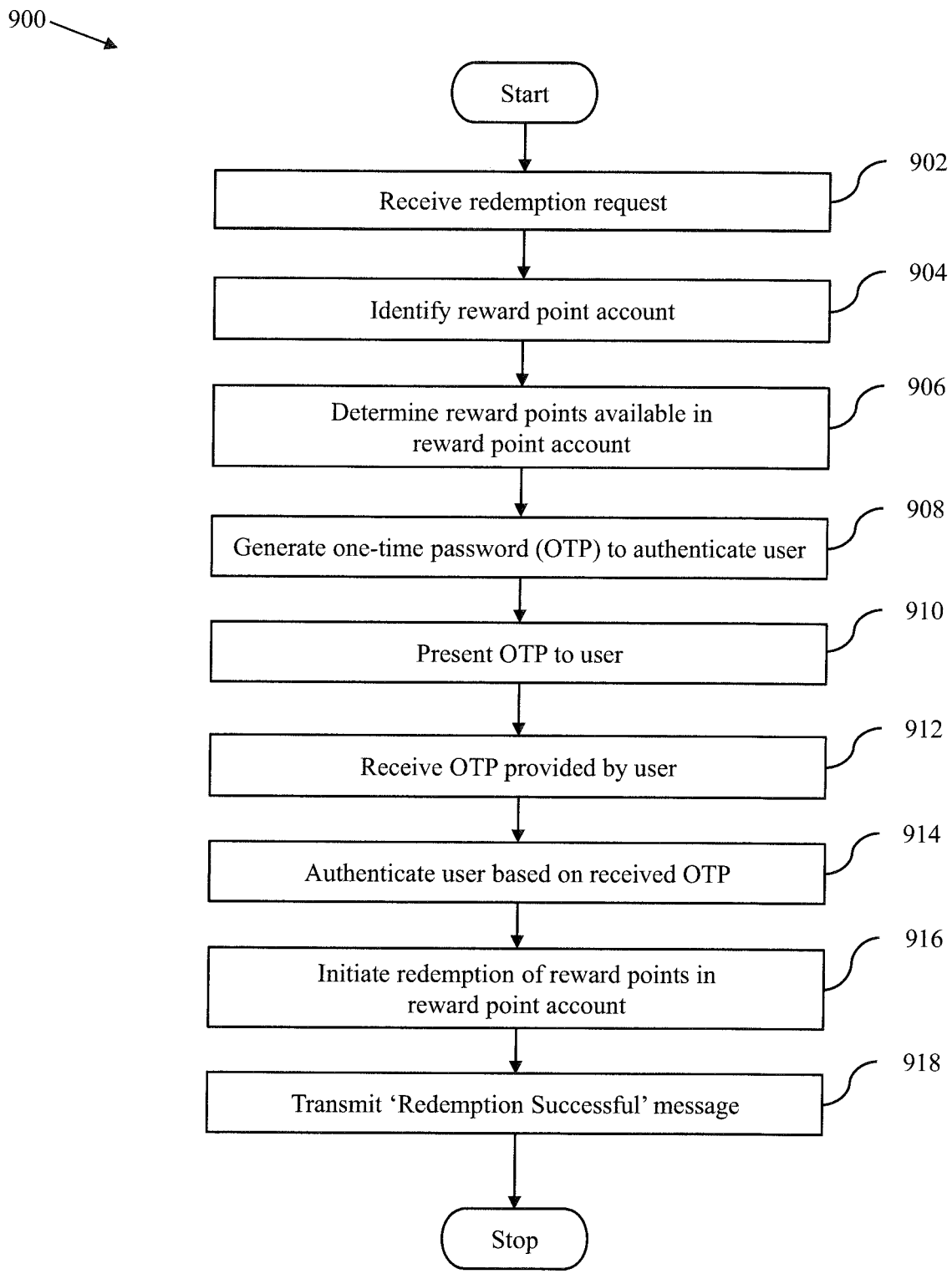
FIG. 9 is a flowchart that illustrates a method for redeeming reward points, in accordance with an exemplary embodiment of the disclosure.

FIG. 9 is a flowchart 900 that illustrates a method for redeeming reward points, in accordance with an exemplary embodiment of the disclosure. A user (e.g., the first user 114 or the second user 124) may want to redeem the reward points in a reward point account of the user against a retail purchase or an e-commerce purchase. The user provides a user identifier of the user or an account identifier of the reward point account for redeeming the reward points.

At step 902, the processing server 128 receives a redemption request, including the user identifier of the user or the account identifier of the reward point account of the user. In one embodiment, the processing server 128 may receive the redemption request from the retail device 112. In another embodiment, the processing server 128 may receive the redemption request from the e-commerce server 118.

At step 904, the processing server 128 identifies the reward point account of the user based on the redemption request. At step 906, the processing server 128 determines reward points available in the reward point account. At step 908, the processing server 128 generates an OTP to authenticate the user for redeeming the reward points from the reward point account. At step 910, the processing server 128 presents the OTP to the user by way of a user device of the user.

At step 912, the processing server 128 receives the OTP provided by the user. In one example, the processing server 128 may receive the OTP provided by the user from the retail device 112. In another example, the processing server 128 may receive the OTP provided by the user from the e-commerce server 118. At step 914, the processing server 128 authenticates the user based on the received OTP.

At step 916, the processing server 128 initiates the redemption of the reward points in the reward point account by debiting reward points from the reward point account. At step 918, the processing server 128 transmits a 'Redemption Successful' message to indicate that the reward points from the reward point account are redeemed. In one example, the processing server 128 transmits the 'Redemption Successful' message to the retail device 112 and the user device of the user. In another example, the processing server 128 transmits the 'Redemption Successful' message to the e-commerce server 118.

Figure 10:
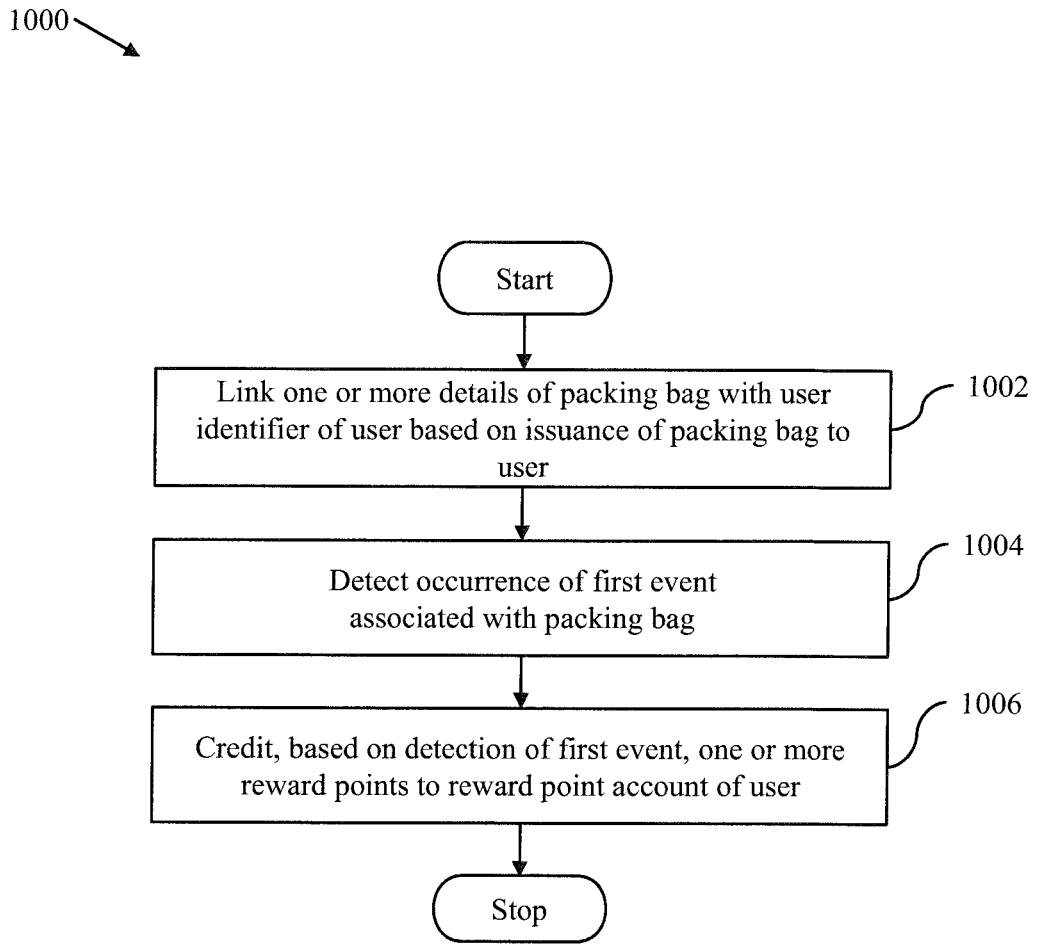
FIG. 10 represents a high-level flow chart that illustrates the method for facilitating reuse or recycling of the packing bags, in accordance with an exemplary embodiment of the disclosure.

FIG. 10 represents a high-level flow chart 1000 that illustrates the method for facilitating reuse or recycling of the packing bags 104, in accordance with an exemplary embodiment of the disclosure. At step 1002, the processing server 128 links one or more details of a packing bag (such as one of the packing bags 104) with a user identifier of a user (such as the first or second user 114 or 124) based on an issuance of the packing bag to the user. The packing bag is associated with an identity tag (such as one of the identity tags 106) that stores one or more details of the packing bag. At step 1004, the processing server 128 detects an occurrence of a first event associated with the packing bag. The first event corresponds to the reuse of the packing bag by the user or submission of the packing bag by the user for recycling. At step 1006, the processing server 128 credits one or more reward points to a reward point account (such as the first or second reward point account) of the user based on the detection of the first event.

Figure 11:
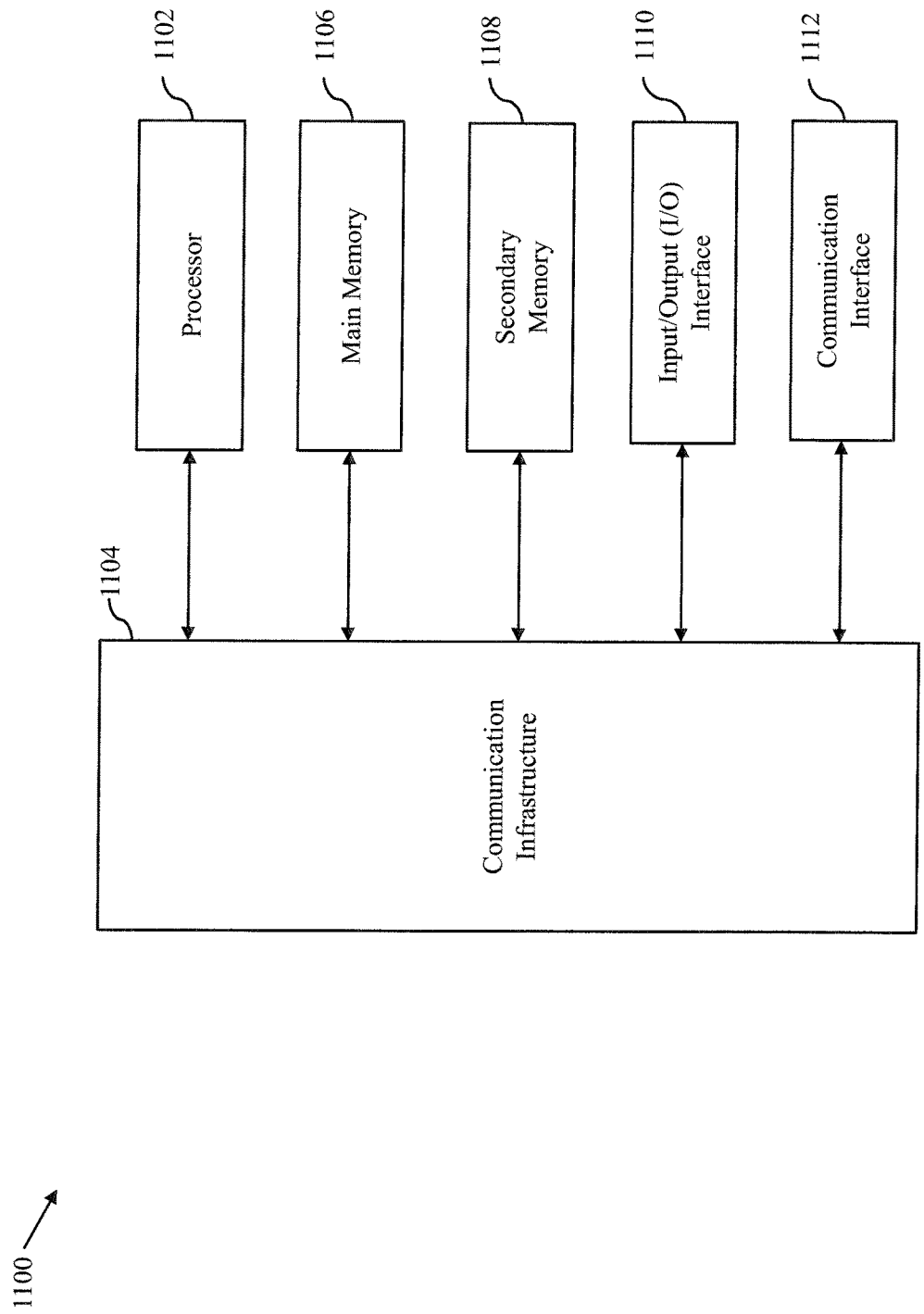
FIG. 11 is a block diagram that illustrates system architecture of a computer system 1100, in accordance with an exemplary embodiment of the disclosure.

FIG. 11 is a block diagram that illustrates system architecture of a computer system 1100, in accordance with an exemplary embodiment of the disclosure. An embodiment of disclosure, or portions thereof, may be implemented as computer readable code on the computer system 1100. In one example, the processing server 128 and the e-commerce server 118 may be implemented in the computer system 1100.

The computer system 1100 includes a processor 1102 that may be a special-purpose or a general-purpose processing device. The processor 1102 may be a single processor, multiple processors, or combinations thereof. The processor 1102 may have one or more processor cores. In one example, the processor 1102 is an octa-core processor. Further, the processor 1102 may be connected to a communication infrastructure 1104, such as a bus, message queue, multi-core message-passing scheme, and the like. The computer system 1100 may further include a main memory 1106 and a secondary memory 1108. Examples of the main memory 1106 may include a RAM, a ROM, and the like. The secondary memory 1108 may include an HDD or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1100 further includes an input/output (I/O) interface 1110 and a communication interface 1112. The I/O interface 1110 includes various input and output devices that are configured to communicate with the processor 1102. Examples of the input devices may include a keyboard, a mouse, a joystick, a touchscreen, a microphone, and the like. Examples, of the output devices may include a display screen, a speaker, headphones, and the like. The communication interface 1112 may be configured to allow data to be transferred between the computer system 1100 and various devices that are communicatively coupled to the computer system 1100. Examples of the communication interface 1112 may include a modem, a network interface, i.e., an Ethernet card, a communications port, and the like. Data transferred via the communication interface 1112 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1100. Examples of the communication channel may include, but are not limited to, cable, fiber optics, a phone line, a cellular phone link, a radio frequency link, and the like. Computer program medium and computer usable medium may refer to memories, such as the main memory 1106 and the secondary memory 1108, which may be a semiconductor memory such as a dynamic RAM (DRAM). These computer program mediums may provide data that enables the computer system 1100 to implement the methods illustrated in FIGS. 8A, 8B, 9, and 10.

A person of ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 1102 and a memory such as the main memory 1106 and the secondary memory 1108 implements the above described embodiments. Further, the operations may be described as a sequential process, however some of the operations may in fact be performed in parallel, concurrently, and/or in a distributed environment. In addition, in some embodiments the order of operations may be rearranged without departing from the spirit of the disclosed subject matter.

The use of the identity tags 106 facilitates the tracking of the packing bags 104. Thus, if a packing bag (for example, any of the packing bags 104) is wrongly disposed, it is possible to identify, by way of the corresponding identity tag, a user to whom the packing bag is issued. The user may thus be held accountable for the wrongful disposal of the packing bag. Additionally, as the details of the packing bag are linked to a user identifier of the user, the user alone can reap benefits of the reward points for the packing bag. This eliminates a scenario where another user earns reward points for reusing or submitting the packing bag issued to the user. As the user is incentivized for each reuse of the packing bag or submission of the packing bag for recycling, the user is additionally motivated to reuse or recycle the packing bag.

In addition to earning monetary benefits, the user is also aiding the efforts of preserving the environment for the future.

Techniques consistent with the disclosure provide, among other features, systems and methods for facilitating reuse or recycling of packing bags (e.g., the packing bags 104). While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an", as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for facilitating reuse or recycling of a packing bag, the method comprising:
    linking, by a server, one or more details of the packing bag with a user identifier of a user based on an issuance of the packing bag to the user, wherein the packing bag is associated with an identity tag that stores the one or more details of the packing bag;
    detecting, by the server, an occurrence of a first event associated with the packing bag, wherein the first event corresponds to the reuse of the packing bag by the user or submission of the packing bag by the user for recycling;
    crediting, by the server based on the detection of the first event, one or more reward points to a reward point account of the user,
    determining that the first event corresponds to returning the packing bag by the user; and
    delinking by the server, the packing bag with the user identifier of the user, the delinking maintaining a reuse count of the packing bag.

2. The method of claim 1, wherein the one or more details of the packing bag include at least one of a packing bag identifier, a minimum reuse count, or a maximum reuse count, the method further comprising:
    linking, by the server, the one or more details of the packing bag with a second user identifier of a second user upon reissuing the packing bag to the second user.

3. The method of claim 2, wherein when the first event corresponds to the reuse of the packing bag, the one or more reward points are credited to the reward point account based on the reuse count and the maximum reuse count associated with the packing bag, and wherein the reuse count is incremented responsive to reuse of the packing bag.

4. The method of claim 1, further comprising:
    storing, by the server in a database, a plurality of details associated with a plurality of packing bags based on manufacturing of the plurality of packing bags, wherein the plurality of packing bags comprise the packing bag issued to the user and the plurality of details comprise the one or more details of the packing bag.

5. The method of claim 1, further comprising:
    receiving, by the server, the one or more details stored in the identity tag of the packing bag when the packing bag is reused or submitted for recycling, wherein the occurrence of the first event is detected based on the received one or more details; and
    identifying, by the server, the user identifier and the reward point account of the user at least by accessing a database storing the linking of the received one or more details of the packing bag with the user identifier and the reward point account of the user.

6. The method of claim 5,
    wherein the one or more details are received by the server from a retail device or an e-commerce server upon the user making a purchase from a retail store or the e-commerce server.

7. The method of claim 1, further comprising:
    creating, by the server, the reward point account of the user based on the issuance of the packing bag to the user.

8. The method of claim 6, wherein the purchase is made from the e-commerce server, the method further comprising:
    receiving, by the server upon scanning the identity tag of the packing bag by a delivery executive using an executive device, the one or more details of the packing bag; and
    identifying, by the server, the user identifier and the reward point account of the user at least by accessing a database storing the linking of the received one or more details of the packing bag with the user identifier and the reward point account of the user.

9. The method of claim 1, further comprising:
    receiving, by the server, a redemption request for redeeming the one or more reward points, wherein the redemption request includes the user identifier of the user or an account identifier of the reward point account; and
    initiating, by the server, the redemption of the one or more reward points by debiting the one or more reward points from the reward point account.

10. A system for facilitating reuse or recycling of a packing bag, the system comprising:
    at least one memory; and
    at least one processor, coupled to the memory, that:
        links one or more details of the packing bag with a user identifier of a user based on an issuance of the packing bag to the user, wherein the packing bag is associated with an identity tag that stores the one or more details of the packing bag;
        detects an occurrence of a first event associated with the packing bag, wherein the first event corresponds to the reuse of the packing bag by the user or submission of the packing bag by the user for recycling;
        credits, based on the detection of the first event, one or more reward points to a reward point account of the user;
        determines that the first event corresponds to returning the packing bag by the user; and delinks the packing bag with the user identifier of the user, the deinking maintaining a reuse count of the packing bag.

11. The system of claim 10, wherein the one or more details of the packing bag include at least one of a packing bag identifier, a minimum reuse count, or a maximum reuse count, wherein the at least one processor links the one or more details of the packing bag with a second user identifier of a second user upon reissuing the packing bag to the second user.

12. The system of claim 11, wherein when the first event corresponds to the reuse of the packing bag, the one or more reward points are credited to the reward point account based on the reuse count and the maximum reuse count associated with the packing bag, and wherein the reuse count is incremented with each reuse of the packing bag.

13. The system of claim 10, wherein the at least one processor further stores, in a database, a plurality of details associated with a plurality of packing bags based on manufacturing of the plurality of packing bags, and wherein the plurality of packing bags comprise the packing bag issued to the user and the plurality of details comprise the one or more details of the packing bag.

14. The system of claim 10, wherein the at least one processor further:
receives the one or more details stored in the identity tag of the packing bag when the packing bag is reused or submitted for recycling, and wherein the occurrence of the first event is detected based on the received one or more details; and
identifies the user identifier and the reward point account of the user at least by accessing a database storing the linking of the received one or more details of the packing bag with the user identifier and the reward point account of the user.

15. The system of claim 14, wherein the at least one processor receives the one or more details from a retail device or an e-commerce server upon the user making a purchase from a retail store or the e-commerce server.

16. The system of claim 10, wherein the at least one processor further creates the reward point account of the user based on the issuance of the packing bag to the user.

17. The system of claim 15, wherein the purchase is made from the e-commerce server, wherein the at least one processor further:
receives, upon scanning the identity tag of the packing bag by a delivery executive using an executive device, the one or more details of the packing bag; and
identifies the user identifier and the reward point account of the user at least by accessing a database storing the linking of the received one or more details of the packing bag with the user identifier and the reward point account of the user.

18. The system of claim 10, wherein the at least one processor further:
receives a redemption request for redeeming the one or more reward points, wherein the redemption request includes the user identifier of the user or an account identifier of the reward point account; and
initiates the redemption of the one or more reward points by debiting the one or more reward points from the reward point account.

19. One or more non-transitory computer readable recording media storing instructions that on execution by a processor perform a method comprising:
linking one or more details of a packing bag with a user identifier of a user based on an issuance of the packing bag to the user, wherein the packing bag is associated with an identity tag that stores the one or more details of the packing bag;
detecting an occurrence of a first event associated with the packing bag, wherein the first event corresponds to a reuse of the packing bag by the user or submission of the packing bag by the user for recycling;
crediting, based on the detection of the first event, one or more reward points to a reward point account of the user;
determining that the first event corresponds to returning the packing bag by the user; and
delinking, by the server, the packing bag with the user identifier of the user the delinking maintaining a reuse count of the packing bag.

20. The one or more non-transitory computer readable recording media of claim 19, wherein the one or more details of the packing bag include at least one of a packing bag identifier, a minimum reuse count, or a maximum reuse count, the method further comprising:
linking, by the server, the one or more details of the packing bag with a second user identifier of a second user upon reissuing the packing bag to the second user.

* * * * *